(12) United States Patent
Hoeng et al.

(10) Patent No.: US 12,538,922 B2
(45) Date of Patent: Feb. 3, 2026

(54) COMPOSITION AND METHODS FOR PARASITE CONTROL

(71) Applicant: Philip Morris Products S.A., Neuchatel (CH)

(72) Inventors: Julia Hoeng, Neuchatel (CH); Nikolai Ivanov, Neuchatel (CH); Kacper Kaminski, Neuchatel (CH); Anatoly Mazurov, Greensboro, NC (US); Sandra Schorderet Weber, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 824 days.

(21) Appl. No.: 17/622,001

(22) PCT Filed: Jun. 24, 2020

(86) PCT No.: PCT/EP2020/067706
§ 371 (c)(1),
(2) Date: Dec. 22, 2021

(87) PCT Pub. No.: WO2020/260392
PCT Pub. Date: Dec. 30, 2020

(65) Prior Publication Data
US 2022/0400674 A1    Dec. 22, 2022

(30) Foreign Application Priority Data

Jun. 24, 2019 (EP) ..................................... 19182100

(51) Int. Cl.
| A01N 43/40 | (2006.01) |
| A01N 65/38 | (2009.01) |
| A01P 17/00 | (2006.01) |

(52) U.S. Cl.
CPC ............. *A01N 43/40* (2013.01); *A01N 65/38* (2013.01); *A01P 17/00* (2021.08)

(58) Field of Classification Search
None
See application file for complete search history.

(56) References Cited

U.S. PATENT DOCUMENTS

| 5,439,690 | A | 8/1995 | Knight |
| 5,693,344 | A | 12/1997 | Knight et al. |
| 6,114,384 | A | 9/2000 | Bessette et al. |
| 6,372,239 | B1 | 4/2002 | Wu et al. |
| 6,531,163 | B1 | 3/2003 | Bessette et al. |
| 6,570,036 | B1 | 5/2003 | Reuter |
| 2004/0064849 | A1 | 4/2004 | Goossens et al. |
| 2009/0205072 | A1 | 8/2009 | Dewey et al. |
| 2012/0117933 | A1 | 5/2012 | Dewey et al. |
| 2012/0118308 | A1 | 5/2012 | Dewey et al. |
| 2013/0195780 | A1* | 8/2013 | Williams ............. A61K 31/444 424/59 |
| 2014/0246036 | A1 | 9/2014 | Qu et al. |
| 2016/0100548 | A1 | 4/2016 | Dewey et al. |
| 2017/0137835 | A1 | 5/2017 | Qu et al. |
| 2017/0189388 | A1 | 7/2017 | Arnold |
| 2018/0139961 | A1 | 5/2018 | Martin et al. |
| 2018/0160643 | A1 | 6/2018 | Dewey et al. |
| 2018/0362994 | A1 | 12/2018 | Qu et al. |
| 2019/0200611 | A1 | 7/2019 | Martin et al. |

FOREIGN PATENT DOCUMENTS

| CN | 105394103 A | 3/2016 |
| CN | 107286132 A | 10/2017 |
| CN | 109418299 A | 3/2019 |
| EP | 0 796 621 A2 | 9/1997 |
| KR | 10-2018-0026293 A | 3/2018 |
| RU | 649 946 C2 | 4/2018 |
| WO | WO 02/083888 A2 | 10/2002 |
| WO | WO2009/064771 A2 | 5/2009 |
| WO | WO2014/134354 A1 | 9/2014 |

(Continued)

OTHER PUBLICATIONS

Bahmani, M., Farkhondeh, T. & Sadighara, P. The anti-parasitic effects of Nicotina tabacum on leeches. Comp Clin Pathol 21, 357-359 (2012). https://doi.org/10.1007/s00580-012-1413-x (Year: 2012).*
Takieddin, K., Khimyak, Y., Fábián, L., (2015), Prediction of Hydrate and Solvate Formation Using Statistical Models, Crystal Growth & Design, vol. 16, Issue 1, doi: 10.1021/acs.cgd.5b00966 (Year: 2015).*
Vemula V, Lagishetty V, Lingala S, Solubility Enhancement Techniques, (2010), International Journal of Pharmaceutical Sciences Review and Research, vol. 5, Issue 1, pp. 41-51 (Year: 2010).*
BOC Sciences,(2025), Anatabine, https://www.bocsci.com/product/anatabine-cas-2743-90-0-177777.html?srsltid=AfmBOooOoBcaJILYUY_V8f0RhhvkDmeg158PwsOuzaOAwF9kCA_-hsNJ (Year: 2025).*
Russian Office Action issued Feb. 5, 2024 in Russian Patent Application No. 2021138239/04 (with English Translation), 13 pages.

(Continued)

*Primary Examiner* — Ali Soroush
*Assistant Examiner* — Afua Bamfoaa Boateng
(74) *Attorney, Agent, or Firm* — Oblon, McClelland, Maier & Neustadt, L.L.P.

(57) ABSTRACT

A formulation containing an extract of a tobacco plant enriched for a compound of formula (I), or a salt or crystal thereof, where the formulation is used for reducing the infestation of ectoparasites:

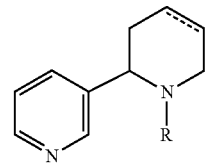

Figure 2A:
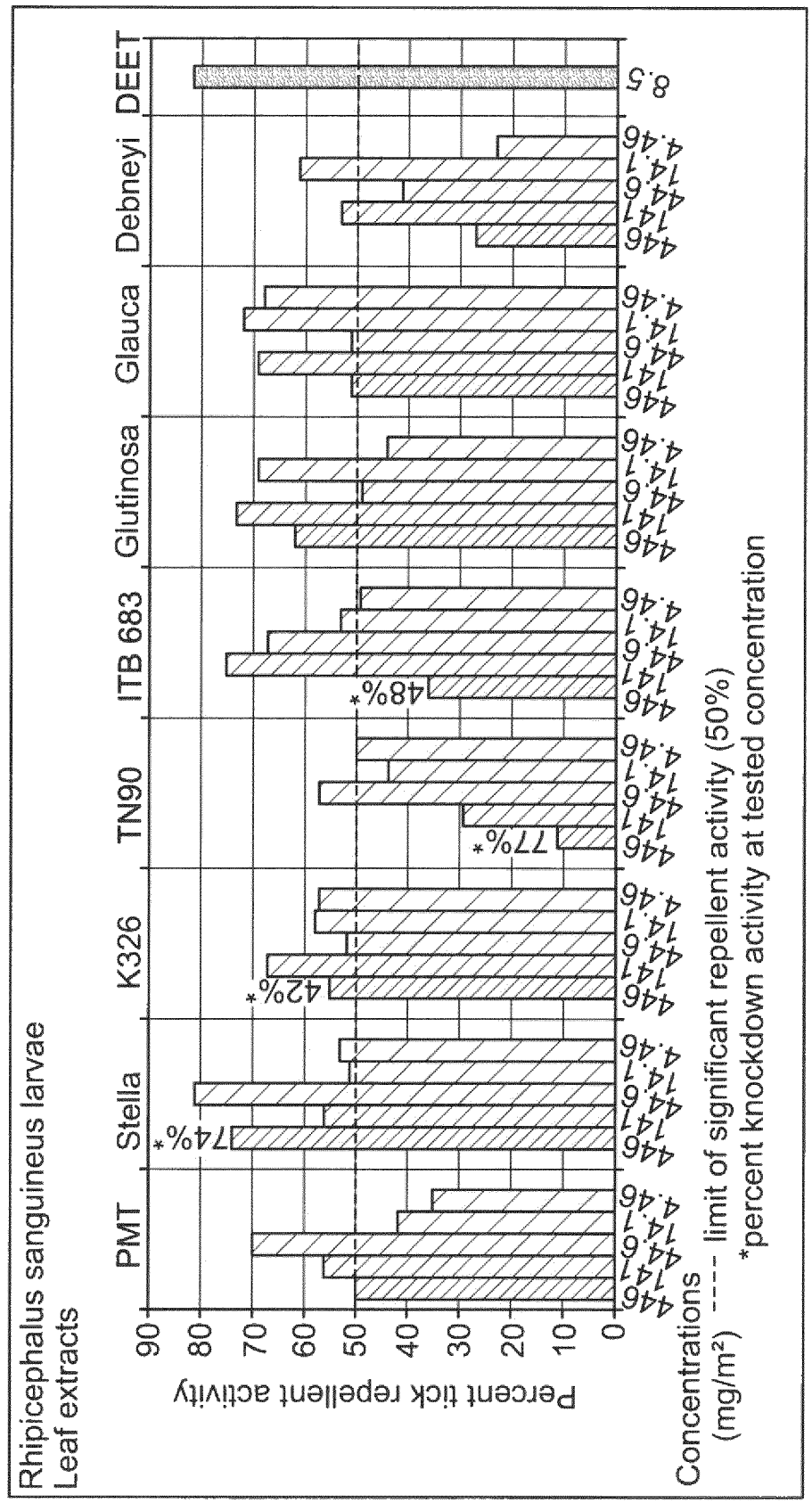

Formula I where
R represents hydrogen or $C_1$-$C_5$ alkyl, and
----- represents a double bond.

18 Claims, 6 Drawing Sheets

(56) References Cited

FOREIGN PATENT DOCUMENTS

| WO | WO 2015/157359 A1 | 10/2015 |
| WO | WO2017/117575 A1 | 7/2017 |

OTHER PUBLICATIONS

Glinka, "General Chemistry" A Study Guide for Higher Educational Institutions, L.; Khimiya, $22^{nd}$ Edition, 1982, pp. 116-117 (total 3 pages).
Taylor, "Recent Developments in Ectoparasiticides", The Veterinary Journal, vol. 161, 2001, p. 255 (total 2 pages).
Extended European Search Report issued Dec. 16, 2019 in European Patent Application No. 19182100.8, 12 pages.
Mahdi Jufri, et al. "Formulation of Tobacco Based Mosquito Repellent to Avoid Dengue Fever" International Journal of PharmTech Research, vol. 9, No. 7, 2016, pp. 140-145.
Géraldine Springuel, et al., "Advances in Pharmaceutical Co-Crystal Screening: Effective Co-Crystal Screening through Structural Resemblance" vol. 12, 2012, pp. 475-484.
Johan Wouters, et al., "Chapter 15: Concluding Remarks using Piracetam as a Learning Model" RSC Drug Discovery, Pharmaceutical Salts and Co-crystals, published in 2012 by the Royal Society of Chemistry, 2012, pp. 330-338.
Johan Wouters, et al., "Chapter 16: Monographs of Most frequent Co-Crystal Formers" RSC Drug Discovery, Pharmaceutical Salts and Co-crystals, published in 2012 by the Royal Society of Chemistry, 2012, pp. 338-382.
Zhang, Xiansheng, "Autumn Rubus Rosaefolius Insecticide and its Preparation Method" Database Caplus [Online] Chemical Abstracts Service, Columbus, Ohio, US; XP002796037, Retrieved from STN Database accession No. 2019:402685, Mar. 5, 2019, 1 page (submitting Abstract only).
Zeng, Fang et al., "Environment Friendly Pesticide" retrieved from STN Database accession No. 2016:428520, XP002796038, Mar. 16, 2016, 1 page (submitting Abstract only).
Database WPI Week 201825 Thomson Scientific, London, GB; AN 2018-23405N, (Biogenoci Co Ltd), XP002796065, Mar. 12, 2018, 2 pages (submitting Abstract only).
Japanese Office Action dated May 30, 2024 in corresponding Japanese Patent Application No. 2021-572858 (with English translation), 15 pages.
Deo, Niranjan M. et al., "Regioselective Alkylation of N-(diphenylmethylidine)-3-(aminomethyl)pyridine: A Simple Route to Minor Tobacco Alkaloids and Related Compounds," Tetrahedron Letters, Feb. 1996, vol. 37, No. 8, pp. 1137-1140.
Li, Yong et al., "Simultaneous Determination of Alkaloids and Their Related Tobacco-Specific Nitrosamines in Tobacco Leaves Using LC-MS-MS," Journal of Chromatographic Science, Jun. 26, 2015, vol. 53, No. 10, pp. 1730-1736.
International Search Report and Written Opinion issued on Aug. 6, 2020 in PCT/EP2020/067706 filed Jun. 24, 2020, 14 pages.
Yamamoto, I., et al., "Studies on Nicotinoids as an Insecticide", Agricultural and Biological Chemistry, vol. 32, No. 11, 1968, XP055646565, pp. 1341-1348, 9 total pages.
Fujita, T., et al., Analysis of the structure-activity relation of nicotinelike insecticides using substituent constants:, Database Caplus, Chemical Abstracts Service, 1971, XP002796040, 1 total page.
Khanna, V., et al., "In silico approach to screen compounds active against parasitic nematodes of major socio-economic importance", NMC Bioinformatics, vol. 12, No. Suppl 13, 2011, XP021111512, pp. 1-12.
Jian, Y., et al., "Effect of plant growth regulator GA3 on alkaloid content in upper leaf of flue-cured tobacco", Database Caplus, Chemical Abstracts Service, 2008, XP002796039, 1 total page.
Scharenberg, F., et al., "Sequestration of pyridine alkaloids anabasine and nicotine from *Nicotina* (Solanaceae) by *Orobanche ramosa* (Orobanchaceae)", Biochemical Systematics and Ecology, vol. 86, 2019, XP085810404, pp. 1-5, 6 total pages.
Weber, S., et al., "Antiparasitic properties of leaf extracts derived from selected *Nicotiana* species and *Nicotiana tabacum* varieties", Food and Chemical Toxicology, vol. 132, 2019, XP085785663, pp. 1-11, 12 total pages.
Schumacher, J., et al., "Smoke Composition. An Extensive Investigation of the Water-Soluble Portion of Cigarette Smoke", Journal of Agricultural and Food Chemistry, vol. 25, No. 2, 1977, XP002451905, pp. 310-320.
Quan, P.M., et al., "The synthesis of Anatabine and Related Compounds", The Journal of Organic Chemistry, vol. 30, No. 8, 1965, XP055715631, pp. 2769-2772.
Combined Russian Office Action and Search Report issued Nov. 21, 2023 in Russian Patent Application No. 2021138239/04 (with English Translation), 21 pages.
Combined Chinese Office Action and Search Report issued Dec. 6, 2023 in Chinese Patent Application No. 202080039120.6 (with English Translation), 17 pages.
Papulov, "Relationship between properties of substances and the structure of molecules: mathematical modelling", Advances in Current Natural Sciences, No. 2, 2006, pp. 75-76.
Gruzdev, "Chemical Protection of Plants", M. Agropromizdat, Third Edition, 1987, p. 27 (total 2 pages).
Caira et al., "Crystalline Polymorphism of Organic Compounds", Topics in Current Chemistry, vol. 198, 1998, pp. 163-208.
Duggirala et al., "Pharmaceutical Cocrystals: along the path to improved medicines", ChemComm, vol. 52, 2016, pp. 640-655.
Bernstein, "Polymorphism of Molecular Crystals", Bioavailability, 2007, pp. 324-330.
Hellinghausen et al., "A comprehensive methodology for the chiral separation of 40 tobacco alkaloids and their carcinogenic E/Z-(R,S)-tobacco-specific nitrosamine metabolites", Talanta, vol. 181, 2018, pp. 132-141.
"RN = 1352502-33-01", Registry, STN, Jan. 6, 2012, 2 pages.
Wang, "Extraction and Bioactivity of Tobacco Alkaloids", Chinese Master's These Full-Text Data base: Engineering Science and Technology I, No. 1, Jun. 2018, pp. 8, 11, 16, 21-26, and 37 (Total 13 pages).

* cited by examiner

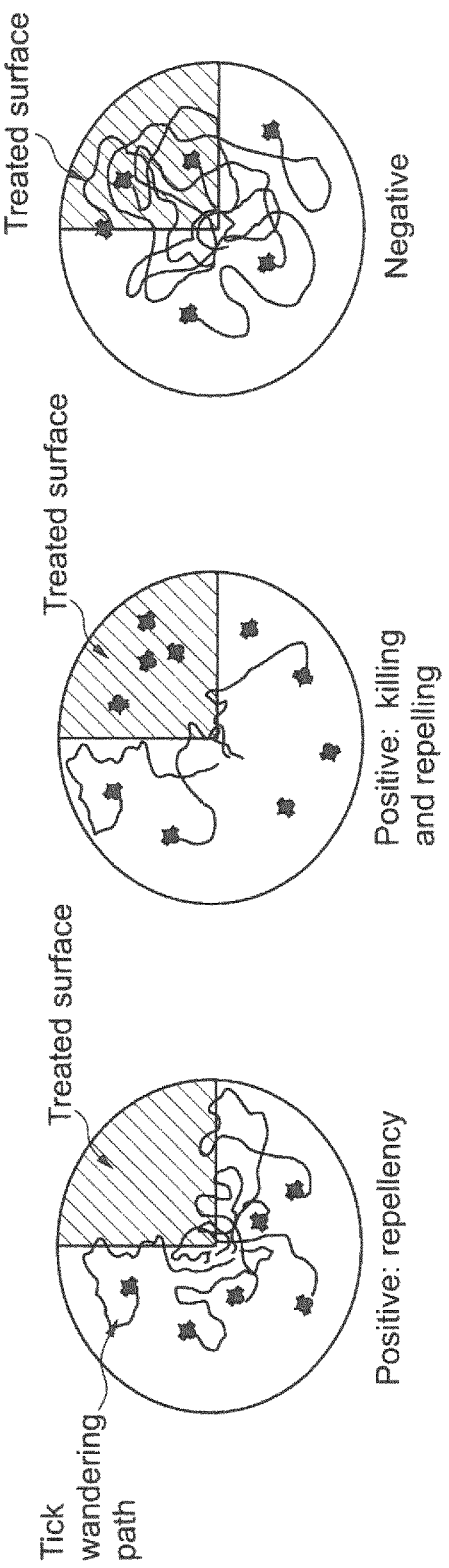

COMPOSITION AND METHODS FOR PARASITE CONTROL

The present invention relates in its broadest aspect to a formulation comprising an extract of a tobacco plant and/or a formulation comprising a compound of Formula I as provided herein, in particular anatabine, and corresponding uses thereof for the reduction of infestation with ectoparasites, in particular insects and/or arachnids. Also provided herein are methods for preparing the enriched extracts and/or formulations of the invention and methods for controlling ectoparasites using the extracts and/or formulations provided herein.

The infestation of animals or humans with parasites is highly undesirable. Humans or animals, for example, horses, dogs and cats all can serve as hosts for a large number of internal and external parasites. The presence of parasites can lead to discomfort, impaired health and performance, and even death. Each year, for example, millions of dogs and cats in the United States are treated for fleas, ticks, and mites. Flea, tick, and mite infestations cause great discomfort, transmit disease to pets and humans.

Several classes of insecticides are effective for combating parasites. For example, pyrethroids, organophosphates, organocarbamates, and phenylpyrazoles are used to treat animals for parasite infestation. The newly discovered isoxazoline class was recently launched for ectoparasite control in dogs and cats. Various methods of formulating anti-parasitic agents are known in the art. These formulations include oral treatments, dietary supplements, powders, sprays, topical treatments (e.g., dips and pour ons), and shampoos. While each of these formulations has some efficacy in combating parasites, the formulations generally include synthetic insecticides or repellents. Synthetic insecticides have been known to cause environmental effects that are harmful to humans and animals. Similarly, Pyrethrin, although extracted from the *Chrysanthemum* flower, is hard to process and standardize.

Natural insecticides, i.e., insecticides that include natural plant essential oils as an active ingredient, have been known to kill household parasites such as ants, cockroaches, and fleas by applying the natural insecticide in the form of a spray, powder, or liquid to a locus or area to be protected from the parasites, as disclosed in U.S. Pat. Nos. 5,439,690, 5,693,344, 6,114,384, and 6,531,163.

Natural compounds or extracts have also been described in the art, e.g. by Jufri et al. (2016) International Journal of PharmTech Research 9, No. 7, pp. 140-145.

Further, tobacco (*Nicotiana* genus spp.) leaves, powder, extracts or fumigants have been used for centuries to control agricultural pests or parasites of medical and veterinary importance. However, because of safety concerns regarding tobacco's major alkaloid nicotine and the discovery of more specific and potent synthetic pesticides, no nicotine-based products are currently commercially available. Synthetic neonicotinoids are structurally related to nicotine and widely used as agricultural and veterinary pesticides; however, unlike tobacco-related alkaloids, synthetic neonicotinoids have a higher selectivity for the insect nicotinic acetylcholine receptor (nAChR) and reduced binding to vertebrate nicotinic receptors. Their unique physicochemical features (photostability, non-volatility and hydrophilicity) explain their success as pesticides, but also their excessive use that lead to an extensive contamination of the environment. Neonicotinoids have now become a major concern for the survival of ecosystems. The proven impact on pollinators, aquatic and soil communities, and a more problematic toxicity profile than once perceived, pushes forward initiatives to limit or totally ban their use in agriculture, and move away from the worldwide use of synthetic pesticides.

In view of the concerns associated with the use of tobacco's major alkaloid nicotine or the structurally related synthetic neonicotinoids, a need still exists for naturally occurring compounds and compositions for use in controlling ectoparasites on humans and/or animals that have better safety profile than nicotine or the synthetic neonicotinoids due to differentiated mode of action and offer a more environmentally friendly solution.

The solution to the above technical problem is characterized in the herein provided embodiments and claims.

Accordingly, the invention relates to, inter alia, the following embodiments:

1. A formulation for reducing infestation of ectoparasites comprising a tobacco extract enriched for a compound of Formula Ia

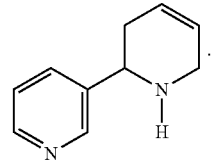

Formula Ia

2. Use of a compound of Formula I, or a salt or crystal thereof, for reducing the infestation of ectoparasites,

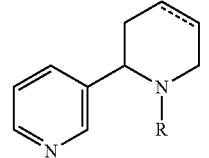

Formula I wherein
   R represents hydrogen or $C_1$-$C_5$ alkyl, and
   ====== represents a single or double bond.
3. The use of embodiment 2, wherein R represents hydrogen or $C_1$-$C_3$ alkyl.
4. The use of embodiment 2 or 3, wherein R represents hydrogen.
5. The use of any one of embodiments 2 to 4, wherein ====== represents a double bond.
6. The formulation of embodiment 1 or the use of any one of embodiments 2 to 5, wherein the ectoparasite is from the insect or the arachnid class, including fleas, ticks, and mites.
7. The formulation of embodiment 1 or 6 or the use of any one of embodiments 2 to 6, wherein the compound is anatabine, S-(−) anatabine, R-(+) anatabine, a mixture of S-(−) anatabine and R-(+) anatabine, or a racemate of S-(−) anatabine and R-(+) anatabine.
8. The use of any one of embodiments 2 to 7, wherein the formulation is as defined in claim 1.
9. The formulation of any one of embodiments 1, 6 or 7, wherein the tobacco extract is produced from *Nicotiana tabacum, Nicotiana glutinosa, Nicotiana glauca* or *Nicotiana debneyi*.
10. The formulation of embodiment 9, wherein *Nicotiana tabacum* is PMT, TN90 or ITB683.

11. The formulation of embodiment 9, wherein *Nicotiana tabacum* is varieties PMT, TN90, K326, Stella or ITB683.

12. The formulation of embodiment 9, wherein the tobacco extract is produced from a variety of *Nicotiana tabacum* wherein the major alkaloid is not nicotine.

13. The formulation of embodiment 1 or the use of any one of embodiments 2 to 8, wherein the formulation or compound is applied in the form of a topical formulation, a shampoo composition, a cleansing composition or a treatment composition.

14. The formulation or the use of embodiment 13, wherein the topical formulation, shampoo composition, cleansing composition or treatment composition is in the form of a lotion, cream, ointment, gel, foam, patch, powder, solid, sponge, tape, vapor, paste, tincture, or spray.

15. The formulation or the use of embodiment 13 or 14, wherein the formulation or compound is applied to a mammal, in particular a human, dog, cat, cattle, horse or sheep.

16. The formulation of embodiment 1 or the use of embodiment 2, wherein the formulation or compound is applied to an object or a fabric.

The present invention furthermore relates to the following aspects

Aspect 1: A compound of Formula I, or a salt or crystal thereof, for use in reducing the infestation of ectoparasites, preferably for use as a repellent for reducing the infestation of ectoparasites,

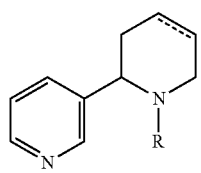

Formula I wherein
R represents hydrogen or $C_1$-$C_5$ alkyl, and
===== represents a double bond.

Aspect 2: The compound of Formula I, or a salt or crystal thereof, for use in the treatment of an ectoparasite infestation, preferably for use as an ectoparasiticide in the treatment of an ectoparasite infestation,

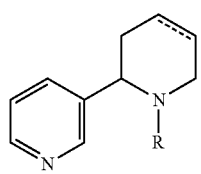

Formula I wherein
R represents hydrogen or $C_1$-$C_5$ alkyl, and
===== represents a double bond.

Aspect 3: Use of a compound of Formula I, or a salt or crystal thereof, for reducing the infestation of ectoparasites, preferably as a repellent for reducing the infestation of ectoparasites,

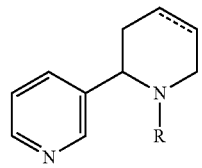

Formula I wherein
R represents hydrogen or $C_1$-$C_5$ alkyl, and
===== represents a single or double bond.

Aspect 4: Use of a compound of Formula I, or a salt or crystal thereof, for the treatment of an ectoparasite infestation, preferably as an ectoparasiticide for the treatment of an ectoparasite infestation,

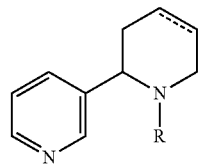

Formula I wherein
R represents hydrogen or $C_1$-$C_5$ alkyl, and
===== represents a single or double bond.

Aspect 5: The compound for use of aspect 1 or aspect 2; or the use of aspect 3 or aspect 4, wherein R represents hydrogen or $C_1$-$C_3$ alkyl, preferably wherein R represents hydrogen.

Aspect 7: The compound for use of any one of aspects 1 to 2 and 5 to 6; or the use of any one of aspects 3 to 6, wherein ===== represents a double bond.

Aspect 8: The compound for use of any one of aspects 1 to 2 and 5 to 7; or the use of any one of aspects 3 to 7, wherein the ectoparasite is from the insect or the arachnid class, including fleas, ticks, and mites.

Aspect 9: The compound for use of any one of aspects 1 to 2 and 5 to 8; or the use of any one of aspects 3 to 8, wherein the compound is anatabine, S-(−) anatabine, R-(+) anatabine, a mixture of S-(−) anatabine and R-(+) anatabine, or a racemate of S-(−) anatabine and R-(+) anatabine.

Aspect 10: The compound for use of any one of aspects 1 to 2 and 5 to 9; or the use of any one of aspects 3 to 9, wherein the compound is applied in the form of a topical formulation, a shampoo composition, a cleansing composition or a treatment composition.

Aspect 11: The compound for use of aspect 10; or the use of aspect 10, wherein the topical formulation, shampoo composition, cleansing composition or treatment composition is in the form of a lotion, cream, ointment, gel, foam, patch, powder, solid, sponge, tape, vapor, paste, tincture, or spray.

Aspect 12: The compound for use of any one of aspects 1 to 2 and 5 to 11; or the use of any one of aspects 3 to 11, wherein the compound or topical formulation is applied to a mammal, in particular a human, dog, cat, cattle, horse or sheep.

Aspect 13: The compound for use of any one of aspects 1 and 5 to 11; or the use of any one of aspects 4 to 11, wherein the compound is applied to an object or a fabric.

Aspect 14: A formulation for reducing infestation of ectoparasites comprising a tobacco extract enriched for a compound of Formula Ia

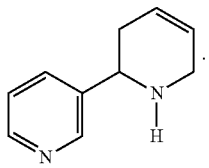

Formula Ia

Aspect 15: The formulation of aspect 14 for use as an ectoparasiticide.

Aspect 16: The formulation of aspect 14 for use as a repellent.

Aspect 17: The formulation of aspect 14 or the formulation for use of aspect 15 or 16, wherein the tobacco extract is produced from Nicotiana tabacum, Nicotiana glutinosa, Nicotiana glauca or Nicotiana debneyi.

Aspect 18: The formulation or formulation for use of aspect 17, wherein Nicotiana tabacum variety is PMT, TN90, K326, Stella or ITB683, preferably PMT, TN90 or ITB683.

Aspect 19. The formulation or formulation for use of aspect 17, wherein the tobacco extract is produced from a variety of Nicotiana tabacum wherein the major alkaloid is not nicotine.

Aspect 20: The formulation of any one of aspects 14 and 17 to 19 or the formulation for use of any one of aspects 15 to 19, wherein the ectoparasite is from the insect or the arachnid class, including fleas, ticks, and mites.

Aspect 21: The formulation of any one of aspects 14 and 17 to 20 or the formulation for use of any one of aspects 15 to 20, wherein the compound is anatabine, S-(−) anatabine, R-(+) anatabine, a mixture of S-(−) anatabine and R-(+) anatabine, or a racemate of S-(−) anatabine and R-(+) anatabine.

Aspect 22: The formulation of any one of aspects 14 and 17 to 21, or the formulation for use of any one of aspects 15 to 21, wherein the formulation is applied in the form of a topical formulation, a shampoo composition, a cleansing composition or a treatment composition.

Aspect 23: The formulation of aspect 22 or the formulation for use of aspect 22, wherein the topical formulation, shampoo composition, cleansing composition or treatment composition is in the form of a lotion, cream, ointment, gel, foam, patch, powder, solid, sponge, tape, vapor, paste, tincture, or spray.

Aspect 24: The formulation of any one of aspects 14 and 17 to 23 or the formulation for use of any one of aspects 15 to 23, wherein the formulation is applied to a mammal, in particular a human, dog, cat, cattle, horse or sheep.

Aspect 25: The formulation of any one of aspects 14 and 17 to 24 or the formulation for use of any one of aspects 15 to 24, wherein the formulation or compound is applied to an object or a fabric.

Aspect 26: The formulation of any one of aspects 14 and 17 to 25 or the formulation for use of any one of aspects 15 to 25, wherein the content of the compound of Formula Ia in the tobacco extract is higher than in the unprocessed tobacco plant.

Aspect 27: The formulation or formulation for use of aspect 26, wherein the compound of Formula Ia is obtained by a method comprising at least one step resulting in the specific enrichment of a compound of Formula Ia.

Aspect 28: The formulation or formulation for use of aspect 26 or aspect 27, wherein the relative content of the compound of Formula I, as comprised in the extract of the invention is increased by 1%.

Aspect 29: The formulation or formulation for use of aspect 26 or aspect 27, wherein the relative content of the compound of Formula I, as comprised in the extract of the invention is increased from 1% to 2%.

Aspect 30: The formulation or formulation for use of aspect 26 or aspect 27, wherein the relative content of the compound of Formula I, as comprised in the extract of the invention is increased by at least 5, 10, 15, 20, 25, 30, 35, 40, 45, or 50%.

Aspect 31: The formulation of any one of aspects 14 and 17 to 30 or the formulation for use of any one of aspects 15 to 30, wherein the tobacco extract is enriched in that the content of a compound of Formula Ia in the tobacco extract is at least 1% higher than in the unprocessed tobacco plant from which the tobacco extract is obtained.

Aspect 32: The formulation of any one of aspects 14 and 17 to 31 or the formulation for use of any one of aspects 15 to 31, wherein the tobacco extract is enriched in that the content of a compound of Formula Ia in the tobacco extract is at least 1% higher than in the unprocessed tobacco plant of the species Nicotiana tabacum Stella.

Aspect 33: The formulation of any one of aspects 14 and 17 to 32 or the formulation for use of any one of aspects 15 to 32, wherein the tobacco extract is enriched in that it contains at least 1% by weight more of the compound of Formula Ia than an extract obtained by extracting leaves of a 4 months old plant of the species Nicotiana tabacum Stella, which have been dried at 60° C. and 70% relative humidity for 24 hours and subsequently ground, using 10 ml methanol once per g of ground leave, at a temperature of 60° C.

As such, the present invention relates to a formulation for reducing infestation of ectoparasites comprising a tobacco extract enriched for a compound of Formula Ia:

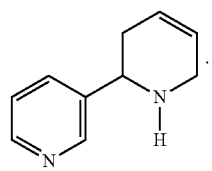

Formula Ia

This is a particular example of a compound of Formula I:

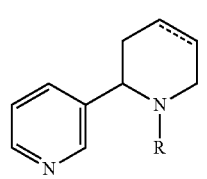

Formula I wherein
R represents hydrogen or $C_1$-$C_5$ alkyl, and
===== represents a single or double bond.

In the context of the present invention, ectoparasite is understood to encompass organisms which inhabit the skin or outer covering, such as scales, feathers, hair, of another organism (host organism) for various periods and particularly those which are dependent on the other organism for sustenance, such as a blood meal. That is, the term ectoparasite includes both those organisms which remain on the skin or outer covering of a host organism for a relatively long period, such as ticks and fleas, and organisms which remain on the host for a relatively short time, such as mosquitoes and tsetse flies, which may be referred to as intermittent ectoparasites.

The inventors have surprisingly and unexpectedly found that compounds of Formula I, in particular anatabine, have an improved effect in the reduction of infestation with ectoparasites, in particular insects or arachnids, including fleas, ticks and mites, in particular ticks. As shown in the appended Examples, the effect of compounds of Formula I, in particular anatabine, is particularly improved over the effect of nicotine, which is considered in the prior art as the most effective repellent comprised in tobacco extracts. Accordingly, the present invention, inter alia, relates to formulations for reducing infestation of ectoparasites comprising a tobacco extract which is enriched for the presence of compounds of Formula Ia, in particular anatabine.

Figure 3A:
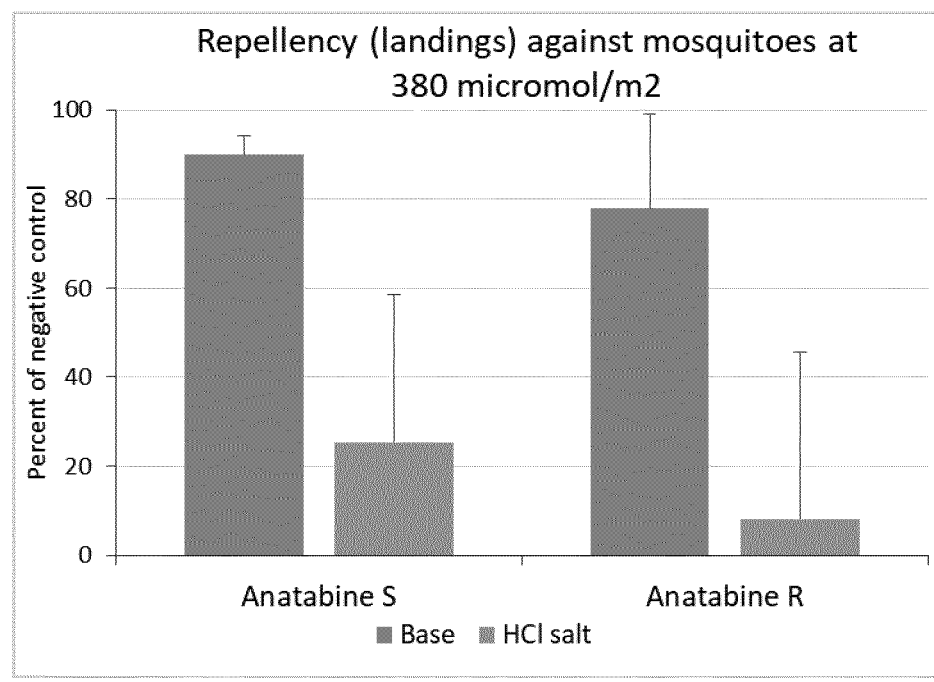
Figure 3B:
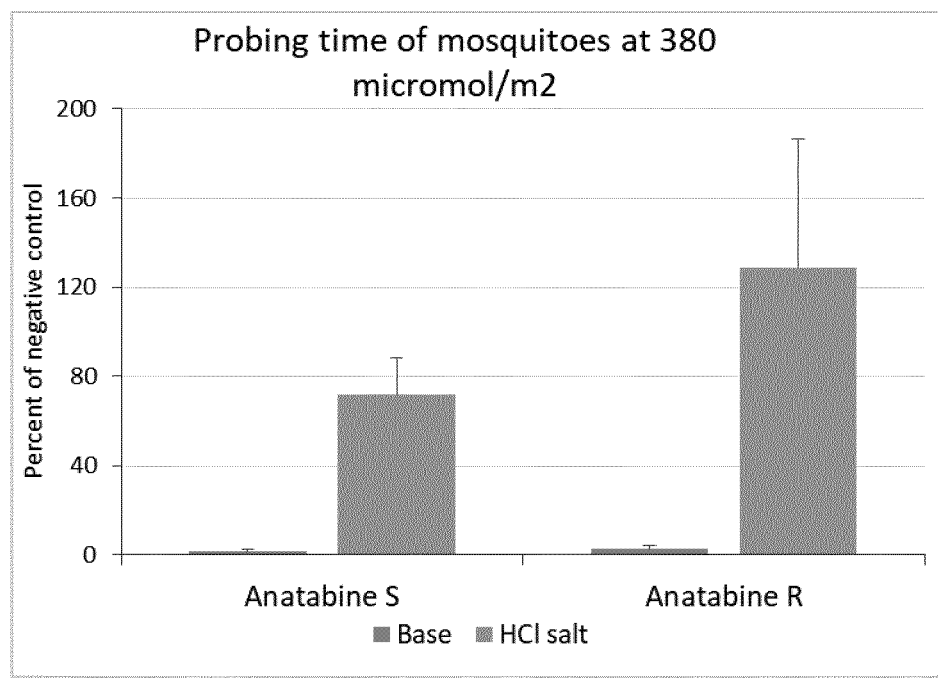

As shown in FIGS. 3a and 3b, the present inventors surprisingly found that anatabine in its base form is a significantly better mosquito repellent than in the HCl salt form. It is therefore preferred that anatabine be used as the free base in the present invention.

Within the present invention, "enriched" means that the content of a compound of Formula Ia, in particular anatabine, in the formulation comprising the tobacco extract of the invention is increased as compared to the content expected by the skilled person, in particular as compared to the average content found in tobacco extracts known in the art. Since the inventors have surprisingly found that compounds of Formula Ia, in particular anatabine, show a higher efficacy as repellent/ectoparasiticide, preferably repellent, as compared to nicotine or nicotine enriched extracts, the formulations comprising the tobacco extracts of the invention which are enriched for the presence of compounds of Formula Ia, in particular anatabine, have a surprisingly higher efficacy in reducing the infestation with ectoparasites, in particular insects and/or ticks.

Preferably, the term "enriched" indicates that the content of a compound of Formula Ia in the tobacco extract is at least 1% higher than in the unprocessed tobacco plant from which the tobacco extract is obtained. Further preferably, the term "enriched" indicates that the tobacco extract has a content of a compound of Formula Ia in the tobacco extract which is at least 1% higher than in the unprocessed tobacco plant of the species Nicotiana tabacum variety Stella. Further preferably, the term "enriched" indicates that the tobacco extract contains at least 1% by weight more of the compound of Formula Ia than an extract obtained by extracting leaves of a 4 months old plant of the species Nicotiana tabacum variety Stella under the same conditions and using the same solvent as used for preparing the claimed tobacco extract. Further preferably, the term "enriched" indicates that the tobacco extract contains at least 1% by weight more of the compound of Formula Ia than an extract obtained by extracting leaves of a 4 months old plant (preferably traditionally cultivated to full maturity and preferably subjected to topping process (removal of flowering parts)) of the species Nicotiana tabacum Stella, which have been dried at 60° C. and 70% relative humidity for 24 hours and subsequently ground, using 10 ml methanol once per g of ground leave, at a temperature of 60° C. The extraction of the leaves is preferably conducted as follows: All plant leaves are oven-dried at 60° C. and 70% relative humidity for 24 h and ground by shaking with glass beads at 400 rpm for 8 h. For each selected tobacco variety/species, 2 g of ground leaf powder are placed in 50 mL glass bottles. Twenty mL of methanol (e.g. high-performance liquid chromatography-grade, ≥99.9% purity, Sigma-Aldrich, St. Louis, MO, USA) are added at 60° C. to the ground leaves. The mixture is then sonicated (e.g. Branson 3510-DTH Ultrasonic Cleaner; Danbury, CT, USA) for 30 min and decanted into a filter column holding a filter paper (125 mm Ø, cellulose paper; preferably Whatman® Maidstone, UK). The filtrate is sonicated with 20 mL of methanol and filtered again. The resulting filtrate is then placed into a rotary evaporator to remove the solvent, and the remaining extract is further lyophilized (e.g. Labconco cat. no. 7934030; Kansas City, MO, USA) for 16 h (until all water is removed).

Further, the term "enriched" may indicate that the mass ratio of the content of the compound of Formula Ia in the tobacco extract to the content of nicotine in the extract is 0.05 or more, preferably 0.1 or more, more preferably 0.2 or more, even more preferably 0.5 or more, still more preferably 1.0 or more, still even more preferably 2.0 or more, or even 4.0 or more.

Within the present invention, reducing the infestation with ectoparasites may be achieved through the repelling activity of the formulation or compound of the invention and/or the killing activity of the formulation or compound of the invention. As such, the formulations or compounds of the invention may have both repelling and killing activity or repelling or killing activity against ectoparasites such as insects and/or ticks. Repelling and/or killing activity may be determined using methods provided herein, in particular methods as employed herein below in the examples section. It is preferred within the present invention that a reduction of infestation of at least 30%, 35%, 40%, 45%, 50%, 55%, 60%, 65%, 70%, 75%, 80%, 85%, 90%, 95% or 100% is achieved, preferably when compared to a control without an active ingredient and applying the identical assay method.

In a further embodiment, the present invention relates to the use of a compound of Formula I, or a salt or crystal thereof, in particular anatabine, for the control of ectoparasites, in particular insects and/or ticks, preferably insects, wherein Formula I is

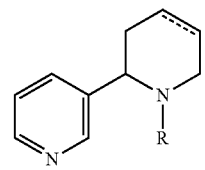

wherein
R represents hydrogen or $C_1$-$C_5$ alkyl, and
====== represents a single or double bond.

Examples of the $C_1$-$C_5$ alkyl group include methyl, ethyl, n-propyl, iso-propyl, n-butyl, iso-butyl, sec-butyl, tert-butyl, n-pentyl (amyl), 2-pentyl (sec-pentyl), 3-pentyl, 2-methylbutyl, 3-methylbutyl (iso-pentyl or iso-amyl), 3-methylbut-2-yl, 2-methylbut-2-yl, and 2,2-dimethylpropyl (neopentyl).

Within the present invention, it is preferred that R represents hydrogen or $C_1$-$C_3$ alkyl.

It is furthermore preferred that R represents hydrogen.

In addition or alternatively, it is preferred that ====== represents a double bond.

The compound as used herein or as comprised in the formulation of the invention can be in pure form or combined with, for example, a suitable excipient or additive.

In a more particularly embodiment of the invention, the compound is anatabine. Within the present invention, anatabine may be a racemate or one enantiomeric form may be present in enantiomeric excess. Accordingly, the anatabine may be S-(−) anatabine or R-(+) anatabine or it may be present at any ratio between both enantiomeric forms.

In one embodiment of the invention, the compound of Formula Ia as provided herein, in particular anatabine, is provided in the form of an extract from a plant. In a particular embodiment of the invention, the plant is tobacco.

It is preferred within the present invention that the tobacco plant is *Nicotiana tabacum, Nicotiana glutinosa, Nicotiana glauca* or *Nicotiana debneyi* species. It is particularly preferred that *Nicotiana tabacum* is TN90, ITB683, or a PMT tobacco plant. *Nicotiana tabacum* can also preferably be K326 or Stella tobacco plant.

It is also preferred that the tobacco extract is produced from a variety of *Nicotiana tabacum* wherein the major alkaloid is not nicotine.

PMT as used herein refers to mutant tobacco plants in which the biosynthesis of nicotine has been modified, resulting in a reduction in the amount of nicotine produced and an increase in the amount of compounds of Formula I. Nicotine biosynthesis begins with the methylation of the polyamine, putrescine, to N-methylputrescine by the enzyme, putrescine N-methyltransferase (PMT), using S-adenosylmethionine as the co-factor. This is the first step that commits precursor metabolites to nicotine biosynthesis. PMT enzymes are classified under the enzyme classification system as EC 2.1.1.53. In the tobacco genome, there are known to be five genes that encode putrescine N-methyltransferases, designated PMT Ia, PMT Ib, PMT2, PMT3, and PMT4. It is contemplated that tobacco plants in which the activity of any one or more of these PMT genes can be advantageously used to provide the starting source of the extract of the invention. The activity of any one or more of these PMT genes can be reduced by recombinant DNA techniques, such as antisense nucleotides, in particular RNAi. Alternatively, traditional breeding can be applied to generate (by mutagenesis), screen and breed for mutant plants that harbor mutation(s) in any one or more of these genes that produce less nicotine. Use of mutant tobacco plants (PMT) generated by transgenic methods or use of stable mutant tobacco plants are encompassed by the invention. Examples of PMT tobacco plants are described in WO2015157359 which is incorporated herein by reference.

Within the present invention, the compound of Formula I, in particular anatabine, or Formula Ia as an extract or the formulation of the invention may be applied in the form of a topical formulation.

The skilled person is aware of various topical formulations. Within the present invention, it is however preferred that the topical formulation is in the form of a lotion, cream, ointment, gel, foam, patch, powder, solid, sponge, tape, vapor, paste or tincture. The topical formulation can furthermore preferably be selected from liquid formulations, such as pour on, spot on and spray formulations.

Accordingly, in one embodiment of the invention, the compound is applied on the skin of a mammal, in particular a human, dog, cat, cattle, or horse.

While the compound, extract, formulation of the invention is effective against a wide range of parasites, it is preferred within the present invention that the parasite is an ectoparasite, in particular an ectoparasite from the phylum arthropoda, more particularly an ectoparasite from the insect or the arachnid class, including fleas, ticks and mites.

Accordingly, in one embodiment of the invention, the use of the compound, extract or formulation of the invention as an insecticide or an ectoparasiticide is provided.

In a further embodiment of the invention, the use of the compound, extract or formulation of the invention as an insect repellent or an ectoparasite repellent is provided.

In another embodiment, the invention relates to a method for providing a formulation comprising an extract of a tobacco plant, the method comprising the steps of (a) obtaining a grinded powder of leaves of a tobacco plant; (b) adding a solvent for extraction to the grinded powder, in one embodiment, methanol; (c) optionally sonicating the mixture obtained in (b); (d) filtering the mixture, wherein step (d) is preferably repeated multiple times; (e) evaporating the filtrate obtained in (d); and (f) optionally lyophilizing the extract.

Also provided herein are formulations comprising extracts obtained by the method provided herein above.

Further aspects and embodiments of the present invention will be become apparent as this description continues.

FIG. 1 Schematic representation of the tick repellent test. 30-60 tick larvae are deposited in the non-treated area of a circular arena (8.96 $cm^2$) whereby one quadrant of the surface (2.25 $cm^2$) is treated. After 1 minute, the distribution of ticks in the treated and untreated areas is measured for a duration of 2 minutes. The repellent/deterrent effect is expressed in %: 100% means that ticks completely avoided the treated surface. Toxicity is measured in the same setup over a duration of 8 minutes and the mortality is expressed in % motility reduction between the beginning and the end of the 8 minutes. Dosages are expressed as a quantity (mg or molarity) per surface unit ($m^2$), as the compound or extract is deposited at the bottom of the well. Pure compounds: dose given in micromoles/$m^2$; Extracts: dose given in micrograms/$m^2$. Tests were run in triplicates.

FIG. 2 Repellent activity of eight tobacco leaf extracts against (A) *R. sanguineus* tick larvae, (B) *R. sanguineus* adult ticks, and (C) *Ixodes ricinus* nymphs. For each concentration, median efficacies of three test replicates are shown. N,N-Diethyl-m-toluamide (DEET) was used as a positive control, and tested only at 8.5 mg/$m^2$, percent of tick knockdown activity observed at the tested concentration in addition to repellence. Repellence was monitored for two minutes, starting one minute after ticks are released into the treated well. Knockdown was determined as the difference in motility between the first minute and the ninth minute after tick release.

FIG. 3 Data from the mosquito repellency assay of anatabine as an HCl salt and in its base form.

Unless defined otherwise, all technical and scientific terms used herein have the same meanings as commonly understood by one of ordinary skill in the art to which this invention belongs.

The term "about" where used to characterize an enantiomeric excess means ±4% referring to the given numeric value, if not indicated otherwise. In each of the invention embodiments, "about" can be deleted.

The term "preferably" is used to describe features or embodiments which are not required in the present invention but may lead to improved technical effects and are thus desirable but not essential.

With respect to the numerical values mentioned herein, unless explicitly stated otherwise, the last decimal place of a numerical value preferably indicates its degree of accuracy. Thus, unless other error margins are given, the maximum margin is preferably ascertained by applying the rounding-off convention to the last decimal place. Thus, a value of 2.5 preferably has an error margin of 2.45 to 2.54.

The present invention relates to, inter alia, a formulation for reducing infestation with ectoparasites comprising an extract of tobacco enriched for a compound of Formula Ia:

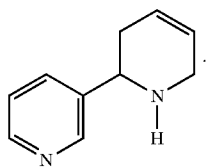

Formula Ia

This is a particular example of a compound of Formula I:

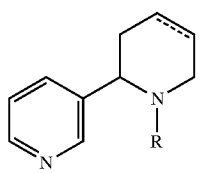

Formula I wherein

R represents hydrogen or $C_1$-$C_5$ alkyl, and

⎯⎯⎯ represents a single or double bond.

The compounds of Formula I, including Formula Ia, contain a chiral carbon atom and may thus, e.g., have a stereochemistry as shown in the following formulae I-1 and I-2:

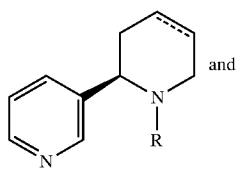

I-1 and

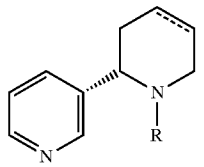

I-2 wherein the definitions as set out with respect to Formula I apply.

In the following, unless stated otherwise, references concerning the compound of Formula I, in as far as the formulation comprising the extract of the present invention is concerned, are deemed to relate to the compound of Formula Ia. In the context of the use according to the present invention, however, references concerning the compound of Formula I, are are to be understood as relating to the compound of Formula I in general, including any salts or crystals thereof, and preferably to the compound of Formula Ia.

An extract is considered "enriched" within the meaning of the present invention, if the content of a compound of Formula Ia above, in particular anatabine, in the tobacco extract is higher than in the unprocessed tobacco plant. Accordingly, the tobacco extract of the invention is obtained by a method comprising at least one step resulting in the specific enrichment of a compound of Formula Ia, in particular anatabine.

The compound of Formula Ia, in particular anatabine, may be enriched by any degree as long as its content is increased. For example, enrichment may be 1%, meaning that the relative content of the compound of Formula I, in particular anatabine, as comprised in the extract of the invention is increased by 1, e.g. from 1% to 2%. Within the present invention, it is preferred that enrichment is by at least 5, 10, 15, 20, 25, 30, 35, 40, 45, or 50%.

Within the present invention, it is preferred that the compound of Formula I is anatabine. As the skilled person is aware, anatabine can be present in two enantiomeric forms, S and R anatabine. The anatabine contained in the extract or formulation of the present invention may be present at any overall range of ratios of R-(+) anatabine and S-(−) anatabine, alternatively expressed as the enantiomeric excess of (R)-(+) anatabine, which has been surprisingly shown to be even more effective as S-(−) anatabine.

It is to be understood that the "ratio" of R-(+) anatabine and S-(−) anatabine as used herein refers to the weight ratio of R-(+) anatabine and S-(−) anatabine, unless explicitly stated otherwise. If solvates of R-(+) anatabine and/or S-(−) anatabine are used, the solvent is thus to be disregarded in this calculation. In other words, the "ratio of R-(+) anatabine and S-(−) anatabine is calculated as follows:

$$\text{Ratio of } R\text{-(+) anatabine and } S\text{-(−) anatabine} = \frac{\text{amount of } R\text{-(+) anatabine by weight}}{\text{amount of } S\text{-(−) anatabine by weight}}$$

As known by the skilled person in the art, the ratio of compounds differing only in chirality, such as in the case of R-(+) anatabine and S-(−) anatabine, can be determined in a number of ways known in the art, including but not limited to chromatography using a chiral support, polarimetric measurement of the rotation of polarized light, nuclear magnetic resonance spectroscopy using chiral shift reagents, or derivatization of a compound using a chiral compound such as Mosher's acid followed by chromatography or nuclear magnetic resonance spectroscopy. Enantiomers can further be isolated from mixtures by methods known to those skilled in the art, including chiral high-pressure liquid chromatography (HPLC) and direct fractional crystallization of the racemate, i.e. anatabine, by chiral co-crystallization techniques, which exploit the formation of specific hydrogen bonding interactions present in co-crystals (see Springuel G R, et al., 2012; and U.S. Pat. No. 6,570,036). Useful co-crystallization partners include enantiomers of mandelic acid, malic acid, tartaric acid and its derivatives; or enantiomers can be prepared by asymmetric syntheses. See, for example, Eliel and Wilen, 1994.

The ratio of R-(+) anatabine and S-(−) anatabine (which may also be referred to as the chiral purity) of the inventive composition can also be expressed in terms of its enantiomeric excess (ee), typically and preferably as determined by chiral HPLC, and calculated by the equation:

$$ee = (A_R - A_S)/(A_R + A_S) \times 100\%,$$

wherein $A_R$ is the area of the peak of R-(+) anatabine and $A_S$ is the area of the peak of S-(−) anatabine, in the HPLC chromatogram of the sample solution.

The compound of Formula Ia, in particular anatabine, may be present in the extract or formulation of the invention or in the uses provided herein as a solvate or co-crystal.

In this respect, within the present invention, a "solvate" refers to an association or complex of one or more solvent molecules and either the R-(+) anatabine or S-(−) anatabine. Examples of solvents that form solvates include, but are not limited to, water, isopropanol, ethanol, methanol, dimethyl sulfoxide (DMSO), ethyl acetate, acetic acid, and ethanolamine. The term "hydrate" refers to the complex where the solvent molecule is water.

A "co-crystal" refers to a crystalline structure that contains at least two different compounds that are solid in their pure form under ambient conditions. The at least two different compounds may include R-(+) anatabine and/or S-(−) anatabine and/or any further components of the composition or extract provided herein. Co-crystals are made from neutral molecular species, and all species remain neutral after crystallization; further, typically and preferably, they are crystalline homogeneous phase materials where two or more building compounds are present in a defined stoichiometric ratio. See hereto Wang Y and Chen A, 2013; and Springuel G R, et al., 2012; and U.S. Pat. No. 6,570,036. It is to be understood that the R-(+) anatabine and S-(−) anatabine may be in the form of any polymorph. A variety of co-crystals and techniques for preparing such co-crystals are described in RSC Drug Discovery, Pharmaceutical Salts and Co-crystals, published in 2012 by the Royal Society of Chemistry and edited by Johan Wouters and Luc Quéré, in particular in chapters 15 and 16. Preferred examples of the co-crystal formers are those disclosed in Table 16.1 of this reference. Even more preferred co-crystals include co-crystals of α-hydroxy acids, α-keto acids and/or α-keto amides with the anatabine enantiomers in the (R) to (S)-ratios as disclosed herein. Examples of α-hydroxy acids include atrolactic acid, benzilic acid, 4-chloromandelic acid, citric acid, 3,4-dihydroxymandelic acid, ethyl pyruvate, galacturonic acid, gluconolactone, glucuronic acid, glucuronolactone, glycolic acid, 2-hydroxybutanoic acid, 2-hydroxypentanoic acid, 2-hydroxyhexanoic acid, 2-hydroxyheptanoic acid, 2-hydroxyactanoic acid, 2-hydroxynonanoic acid, 2-hydroxydecanoic acid, 2-hydroxyundecanoic acid, 4-hydroxymandelic acid, 3-hydroxy-4-methoxymandelic acid, 4-hydroxy-3-methoxymandelic acid, α-hydroxyarachidonic acid, α-hydroxybutyric acid, α-hydroxyisobutyric acid, α-hydroxylauric acid, α-hydroxymyristic acid, α-hydroxypalmitic acid, α-hydroxystearic acid, 3-(2'-hydroxyphenyl) lactic acid, 3-(4'-hydroxyphenyl)lactic acid, lactic acid, malic acid, mandelic acid, methyllactic acid, methylpyruvate, mucic acid, α-phenylacetic acid, α-phenylpyruvic acid, pyruvic acid, saccharic acid, tartaric acid and tartronic acid. Examples of α-keto acids include 2-ketoethanoic acid (glyoxylic acid), methyl 2-ketoethanoate, 2-ketopropanoic acid (pyruvic acid), methyl 2-ketopropanoate (methyl pyruvate), ethyl 2-ketopropanoate (ethyl pyruvate), propyl 2-ketopropanoate (propyl pyruvate), 2-phenyl-2-ketoethanoic acid (benzoylformic acid), methyl 2-phenyl-2-ketoethanoate (methyl benzoylformate), ethyl 2-phenyl-2-ketoethanoate (ethyl benzoylformate), 3-phenyl-2-ketopropanoic acid (phenylpyruvic acid), methyl 3-phenyl-2-ketopropanoate (methyl phenylpyruvate), ethyl 3-phenyl-2-ketopropanoate (ethyl phenylpyruvate), 2-ketobutanoic acid, 2-ketopentanoic acid, 2-ketohexanoic acid, 2-ketoheptanoic acid, 2-ketooctanoic acid, 2-ketododecanoic acid and methyl 2-ketooctanoate. Examples of α-keto amides include any compounds obtainable by reacting any one of the above examples of α-keto acids with primary or secondary amines.

The extract, compound, or formulation of the invention is also provided for use in the control of insects that are parasites, particularly of ectoparasites, particularly for the reduction of infestation with the same. Accordingly, the present invention, inter alia, relates to the use of the extract, compound or formulation provided herein for reducing infestation with ectoparasites, in particular ectoparasites from the phylum arthropoda, more particularly an ectoparasite from the insect or the arachnid class, including fleas, ticks and mites, etc.

In the context of the present invention, insects may be in particular fleas. However, within the invention the term "insects" includes insects of the order: *lepidoptera, coleoptera, homoptera, heteroptera, Diptera*, Thysanoptera, *orthoptera, anoplura, Siphonaptera*, Mallophaga, *thysanura, Isoptera*, Psocoptera and *hymenoptera*.

However, the invention relates in particular to those which trouble humans or animals and carry pathogens, for example flies such as *Musca domestica, Musca vetustissima, Musca autumnalis, Fannia canicularis, Sarcophaga carnaria, Lucilia cuprina, Hypoderma bovis, Hypoderma lineatum, Chrysomyia chloropyga, Dermatobia hominis, Cochliomyia hominivorax, Gasterophilus intestinalis, Oestrus ovis, Stomoxys calcitrans, Haematobia irritans* and Nematocera, such as midges, Ceratopogonidae, Simuliidae, and Psychodidae including the Phlebotoma and Lutzomyia genera), for example fleas, such as *Ctenocephalides felis* and *Ctenocephalides canis* (cat and dog fleas), *Xenopsylla cheopis, Pulex irritans, Dermatophilus penetrans*, blood-sucking lice (*anoplura*), such as *Haematopinus* spp, *Solenopotes* spp, *Linognathus* spp, *Pediculus humanis*, chewing-lice (mallophaga), such as *Bovicola* (*Damalina*) *ovis* and *Bovicola bovis*, biting flies and horse-flies (*tabanidae*), *Haematopota* spp. such as *Haematopota pluvialis, tabanidae* spp. such as *Tabanus nigrovittatus, Chrysopsinae* spp. such as *Chrysops caecutiens*, tsetse flies, such as species of *Glossinia*, nuisance insects, particularly cockroaches, such as *Blatella germanica, Blatta orientalis*, and *Periplaneta americana*.

In the context of the present invention, ectoparasites of the arachnid class may be in particular ectoparasites of the order Acarina, including mites and ticks. Representatives of mites are, for example, *Dermanyssus gallinae, Sarcoptes scabiei, Psoroptes ovis* and *Psorergates* spp. Known representatives of ticks are, for example, *Boophilus, Amblyomma, Anocentor, Dermacentor, Haemaphysalis, Hyalomma, Ixodes, Rhipicentor, Margaropus, Rhipicephalus, Argas, Otobius* and *Ornithodoros* and the like, which preferably infest warm-blooded animals including farm animals, such as cattle, horses, pigs, sheep and goats, poultry such as chickens, turkeys and geese, fur-bearing animals such as mink, foxes, chinchillas, rabbits and the like, as well as companion animals such as cats and dogs, but also humans.

Ticks may be divided into hard and soft ticks. Hard ticks are characterised by infesting one, two or three host animals. They attach themselves to a passing host animal and suck the blood or body fluids. Fully engorged female ticks drop from the host animal and lay large amounts of eggs (2000 to 3000) in a suitable crack in the floor or in any other protected site where the larvae hatch. These in turn seek a host animal, in order to suck blood from it. Larvae of ticks which only infest one host animal moult twice and thus become nymphs and finally adult ticks without leaving the host they have selected. Larvae of ticks which infest two or three host animals leave the animal after feeding on the blood, moult in the local environment and seek a second or third host as nymphs or as adult ticks, in order to suck its blood.

Ticks are responsible world-wide for the transmission and spread of many human and animal diseases. Because of their economic influence, the most important tick genera are *Boophilus, Rhipicephalus, Ixodes, Hyalomma, Amblyomma* and *Dermacentor*. They are carriers of viral, bacterial (including *Rickettsia* and *Spyrochetes*) and protozoal diseases and cause tick-paralysis and tick-toxicosis. Even a single tick can cause paralysis whereby its saliva penetrates into the host animal during ingestion. Diseases caused by ticks are usually transmitted by ticks, which infest several host animals. Such diseases, for example anaplasmosis, ehrlichiosis, babesiosis, theileriosis and heart water disease, are responsible for the death or impairment of a large number of domestic and farm animals in the entire world. In many countries of temperate climate, ticks of the genus *Ixodes* transmit the agent of the chronically harmful Lyme's disease from wild animals to humans. Apart from the transmission of disease, the ticks are responsible for great economic losses in livestock production. Losses are not confined to the death of the host animals, but also include damage to the pelts, loss of growth, a reduction in milk production and reduced value of the meat. Although the harmful effects of a tick infestation on animals have been known for years, and enormous progress has been made using tick-control programmes, until now no completely satisfactory methods of controlling or eliminating these parasites have been found, and in addition, ticks have often developed resistance to chemical active ingredients.

The infestation of fleas on domestic animals and pets likewise still represents for the owner a problem which has not been satisfactorily resolved or can only be resolved at considerable expense. As with ticks, fleas are not only troublesome, but are carriers of disease. For example, to be mentioned here is Flea Atopic dermatitis (FAD), a serious skin disease in dogs, which is difficult to treat. Fleas can transmit various fungal diseases from host animal to host animal and to the animal keeper, particularly in moist, warm climatic areas, for example in the Mediterranean, in the southern part of USA, etc. Those at risk in particular are people with a weakened immune system or children whose immune system has not yet fully developed.

Owing to their complex life cycle, none of the known methods for the control of fleas is completely satisfactory, especially as most known methods are basically directed towards the control of adult fleas in the pelt, and leave completely untouched the different juvenile stages of the fleas, which exist not only in the pelt of the animal, but also on the floor, in carpets, in the bedding of the animal, on chairs, in the garden and all other places with which the infested animal comes into contact. Flea treatment can be expensive and has to be continued over long periods of time.

Success usually depends on treating not only the infested animal, e.g. the human, dog, cat, cattle, horse, but at the same time all the locations which the infested animal frequents.

Such a complicated procedure is unnecessary with the present compounds of formula (I), since a particular advantage of the compounds of formula I under discussion is that they are extremely effective and at the same time of very low toxicity for the warm-blooded animals.

The compounds of formula (I) according to the present invention may be mixed with other substances having the same sphere of activity or with parasiticides or with other activity-improving substances to achieve further improved or longer-lasting action, and then applied.

Since the active ingredients are in many instances applied to warm-blooded animals and of course come into contact with the skin, suitable formulation excipients are the excipients and administration forms that are known in cosmetics. They may be administered in the form of solutions, emulsions, ointments, creams, pastes, powders, sprays, etc.

The compounds of formula (I) according to the present invention may be formulated for application to the animal by any technique suitable for topical administration, including a spraying, dipping, or a pour-on technique. Further preferred application techniques include slow release devices, such as bracelet, collars or ear tags (for cattle) aiming at providing long lasting protection against ectoparasites.

The compounds of formula (I) according to the present invention is preferably applied externally to the skin of the animal using an applicator device, such as a gun, spray, or the animal is submerged in a bath of the dip formulation.

In particular, suitable formulations may be applied in a liquid form or an aerosol form. The aerosol form may use a liquid or a gas as a propellant. These include, for example, conventional propellant gases required for spray cans, such as propane, butane, dimethyl ether, $CO_2$, or halogenated lower alkyl gases (for example, halogenated $C_1$-$C_4$ alkyls), and mixtures of two or more thereof.

In particular, the compounds of formula (I) according to the present invention is formulated such that they can be sprayed directly in an area of infestation or they can be bound to a solid support or encapsulated in a time release material.

The solid support may be provided in form of collars, which are designed to combat common external parasites on companion animals. These collars typically consist of a matrix, usually of a matrix of a plastics material containing between 5 and 40% of an active substance and allow a release of the active ingredient over an extended time. These collars therefore ensure a long-lasting protection against ectoparasites.

For administration to farm animals or pets, such as cows, horses, asses, camels, dogs, cats, poultry, sheep, goats, etc., the so-called 'pour-on' or 'spot-on' formulations are also suitable; these liquid or semi-liquid formulations have the advantage that they only have to be applied to a small area of the pelt or plumage, and, thanks to the proportion of spreading oils or other spreading additives, they disperse by themselves over the whole pelt or plumage, without having to do anything else, and become active over the whole area.

Of course, inanimate materials, for example clothing or dog and cat baskets, stables, carpets, curtains, living quarters, conservatories, etc. may be treated with said formulations and thus protected from parasite infestation.

For application on humans, a pleasant-smelling essence, e.g. a perfume, can be added to make application more attractive.

In a preferred embodiment of the present invention, the compound of the invention or the extract of the invention is applied in the form of a topical formulation.

Thus, in accordance with the present invention, a formulation is provided comprising a compound of Formula I, in particular anatabine.

In certain embodiments the compound of Formula I may be placed in liposomes. In accordance with the present invention, any phospholipid and/or phospholipid derivative such as a lysophospholipid may be utilized to form a liposome for encapsulating the compound of Formula I. Suitable phospholipids and/or phospholipid derivatives include, but are not limited to, lecithin, lysolecithin, phosphatidylcholine, phosphatidylethanolamine, phosphatidylinositol, phosphatidylglycerol, phosphatidic acid, phosphatidylserine, lysophosphatidylcholine, lysophosphatidylethanolamine, lysophosphatidylglycerol, lysophosphatidic acid, lysophosphatidylserine, PEG-phosphatidylethanolamine, PVP-phosphatidylethanolamine, combinations thereof, and the like.

In some embodiments, a lecithin derived from egg or soybean may be utilized as the phospholipid. Such lecithins include those commercially available as PHOSPHOLIPON® 85G, PHOSPHOLIPON® 90G, and PHOSPHOLIPON® 90H (the fully hydrogenated version of PHOSPHOLIPON® 90G) from American Lecithin Company, Oxford, CT. Other suitable lecithins include LECINOL S-10® lecithin from Nikko Chemicals.

The above phospholipids or derivatives thereof may be utilized to form liposomes containing the compound of Formula I or alternative formulations comprising Formula I. In embodiments, a lecithin having a high phosphatidylcholine content may be utilized to form a liposome. In some embodiments a high phosphatidylcholine lecithin which may be utilized includes PHOSPHOLIPON® 85G, a soy-derived lecithin containing a minimum of about 85% of a linoleic acid based-phosphatidylcholine. This lecithin is easy to use and is able to produce submicron liposomes at low process temperatures (from about 20° C. to about 55° C.) without the addition of any other special additives. PHOSPHOLIPON® 85G contains, in addition to phosphatidylcholine, approximately 5-7% phosphatidic acid. The phosphatidic acid confers a negative surface charge to the resulting formulations, reduces processing time and process energy, and aids in the formation of stable forms.

In some embodiments, additional components may be combined with the formulation to improve overall rheological and processing properties, and to insure microbiological integrity during storage. Such components include, without limitation, absorbents, antifoaming agents, acidifiers, alkalizers, buffers, antimicrobial agents, antioxidants (for example tocopherols, BHT, polyphenols, phytic acid) binders, biological additives, chelating agents (for example, disodium EDTA, tetrasodium EDTA, sodium metasilicate, and the like), denaturants, preservatives (for example imidazolidinyl urea, diazolidinyl urea, phenoxyethanol, methylparaben, ethylparaben, propylparaben, and the like), reducing agents, solubilizing agents, solvents, viscosity modifiers, humectants, thickening agents, and combinations thereof. These additional components may be present in an amount from about 0.001% by weight to about 10% by weight of the dispersion, in embodiments from about 0.1% by weight to about 1% by weight of the dispersion.

Examples of suitable humectants which may be added to the formulation include, but are not limited to, polyols and polyol derivatives, including glycerol, diglycerol, triglycerol, ethylene glycol, propylene glycol, butylene glycol, pentylene glycol (sometimes referred to herein as 1,2-pentane diol), isopreneglycol (1,4-pentane diol), 1,5-pentane diol, hexylene glycol, erythritol, 1,2,6-hexanetriol, polyethylene glycols such as PEG-4, PEG-6, PEG-7, PEG-8, PEG-9, PEG-10, PEG-12, PEG-14, PEG-16, PEG-18, PEG-20, combinations thereof, sugars and sugar derivatives (including fructose, glucose, maltose, maltitol, mannitol, inositol, sorbitol, sorbityl silanediol, sucrose, trehalose, xylose, xylitol, glucuronic acid and salts thereof), ethoxylated sorbitol (Sorbeth-6, Sorbeth-20, Sorbeth-30, Sorbeth-40), and combinations thereof. In some embodiments, a commercially available 1,2-pentane diol such as HYDROLITE-5® pentylene glycol (commercially available from Symrise GmbH) may be utilized. In other embodiments, a propylene glycol may be utilized. Where utilized, such humectants may be present in amounts from about 0.1% by weight to about 20% by weight of the dispersion, in embodiments from about 3% by weight to about 10% by weight of the dispersion.

In some embodiments, a preservative such as phenoxyethanol and a humectant such as butylene glycol, hexylene glycol, pentylene glycol and/or propylene glycol may both be added to the formulation. In embodiments, the pentylene glycold and/or propylene glycol may provide humectancy and assist in the preservation of the concentrate when combined with phenoxyethanol. The phenoxyethanol and pentylene glycol and/or propylene glycol mix should be water soluble and non-volatile.

The compound of Formula I may be present in the resulting concentrate in an amount of from about 10% by weight of the concentrate to about 30% by weight of the concentrate, in embodiments from about 18% by weight of the concentrate to about 26% by weight of the concentrate, in some embodiments from about 21% by weight of the concentrate to about 22% by weight of the concentrate. The amount of phospholipids in the concentrate may be from about 1% by weight of the concentrate to about 20% by weight of the concentrate, in embodiments from about 4% by weight of the concentrate to about 12% by weight of the concentrate, with the balance being the solvent, humectant and preservative.

The resulting formulation may be administered directly or, in embodiments, may be combined with any acceptable carrier. As used herein the terms "acceptable carrier" and "acceptable carriers" refers to those compounds which are suitable for use in contact with the tissues of the human or animal without undue toxicity, irritation, allergic response, and the like, commensurate with a reasonable benefit/risk ratio, and effective for their intended use, as well as salts and biocompatible derivatives of those compounds. As used herein, a pharmaceutically acceptable carrier includes any and all solvents, including water, dispersion media, coatings, antibacterial and antifungal agents, stabilizing excipients, absorption enhancing or delaying agents, polymers, including polymeric binders and polymeric adhesives, combinations thereof, and the like. Such materials should be nontoxic to the recipients at the dosages and concentrations employed, and may include buffers such as TRIS-HCl, phosphate, citrate, acetate and other organic acid salts; antioxidants such as ascorbic acid; low molecular weight (less than about ten residues) peptides such as polyarginine, proteins such as serum albumin, gelatin, or immunoglobulins; hydrophilic polymers such as polyvinylpyrrolidinone; amino acids such as glycine, glutamic acid, aspartic acid, or arginine; monosaccharides, disaccharides, and other carbohydrates including cellulose or its derivatives, glucose, mannose, or dextrins; chelating agents such as EDTA; sugar alcohols such as mannitol or sorbitol; counterions such as sodium and/or nonionic surfactants such as TWEEN, PLURONICS and/or polyethylene glycol.

The use of such media and agents is within the purview of those skilled in the art. Supplementary active ingredients can also be incorporated into the compositions.

In embodiments, the above carriers may be utilized alone or in combination to form a carrier system. Suitable carrier systems are within the purview of those skilled in the art and may include, but are not limited to, lotions, creams, gels, emulsions, dispersions, solids, solid sticks, semisolids, aerosol or non-aerosol foams, sprays, serums, transdermal adhesive patch systems, combinations thereof, and the like. In embodiments, the liposomes may be in a liposomal concentrate and may be introduced with a permeation enhancer as described above. In embodiments, the permeation enhancer may be present in a water phase added to the liposomal concentrate to form a composition of the present disclosure. In embodiments, the formulation may be used for transdermal delivery.

The compound of Formula I may thus be present in the final composition, in embodiments a lotion, cream or any other suitable form described above, in amounts of from about 0.5% by weight to about 20% by weight of the composition, in embodiments from about 0.75% by weight to about 10% by weight of the composition, in other embodiments from about 1% by weight to about 7.5% by weight of the composition, in other embodiments from about 1.25% by weight to about 5% by weight of the composition, in other embodiments from about 1.5% by weight to about 3% by weight of the composition. In other embodiments, the compound of Formula I may be present in the final composition, in embodiments a lotion, cream or any other suitable form described above, in amounts of from about 0.2% by weight to about 50%, preferably from about 5% by weight to about 50% by weight of the composition, in embodiments from about 10% by weight to about 50% by weight of the composition.

For example, in some embodiments a lotion or cream may include an oil phase which, in turn, may include emollients, fatty alcohols, emulsifiers, combinations thereof, and the like. For example, an oil phase could include emollients such as C12-15 alkyl benzoates (commercially available as FINSOLV™ TN from Finetex Inc. (Edison, NJ)), capric-caprylic triglycerides (commercially available from Huls as MIGLYOL™ 812), and the like. Other suitable emollients which may be utilized include vegetable derived oils (corn oil, safflower oil, olive oil, macadamia nut oil, etc.); various synthetic esters, including caprates, linoleates, dilinoleates, isostearates, fumarates, sebacates, lactates, citrates, stearates, palmitates, and the like; synthetic medium chain triglycerides, silicone oils or polymers; fatty alcohols such as cetyl alcohol, stearyl alcohol, cetearyl alcohol, lauryl alcohol, combinations thereof, and the like; and emulsifiers including glyceryl stearate, PEG-100 stearate, Glyceryl Stearate, Glyceryl Stearate SE, neutralized or partially neutralized fatty acids, including stearic, palmitic, oleic, and the like; vegetable oil extracts containing fatty acids, Ceteareth-20, Ceteth-20, PEG-150 Stearate, PEG-8 Laurate, PEG-8 Oleate, PEG-8 Stearate, PEG-20 Stearate, PEG-40 Stearate, PEG-150 Distearate, PEG-8 Distearate, combinations thereof, and the like; or other non-polar cosmetic or pharmaceutically acceptable materials used for skin emolliency within the purview of those skilled in the art, combinations thereof, and the like.

The emollients, $C_{12-15}$ alkyl benzoates, may be included for emolliency and spreadability. Where present, the emollient may be present in an amount from about 0.2% by weight to about 15% by weight of the total composition, in embodiments from about 2% by weight to about 6% by weight of the total composition. Alcohols such as cetyl alcohol and stearyl alcohol may be added to impart body or texture to a cream. Where both cetyl alcohol stearyl alcohol are utilized, the ratio of cetyl alcohol to stearyl alcohol may be from about 2:1 to about 1:2, with the waxy alcohols making up from about 1 to about 6 weight percent of the total composition, in embodiments from about 2% by weight to about 4% by weight of the total composition.

As noted above, this oil phase may also include emulsifiers. Suitable emulsifiers include, but are not limited to, stearates including glyceryl stearate, PEG-100 stearate, glyceryl stearate SE, glyceryl stearate citrate, combinations thereof, and the like. In embodiments, a combination of stearates may be utilized in the oil phase as an emulsifier. For example, a glyceryl stearate and PEG-100 stearate mixture (in embodiments, a mixture of glyceryl stearate and polyethylene glycol 100 stearate commercially available as ARLACEL® 165 from ICI Americas) may be used as an emulsifier to form an oil-in-water (o/w) emulsion. In such a combination, the PEG-100 stearate may act as the primary emulsifier and the glyceryl stearate may be a co-emulsifier. The emulsifier may be present in an amount from about 2% by weight to about 8% by weight of the total composition, in embodiments from about 3% by weight to about 5% by weight of the total composition.

The weight ratio of emulsifier to emollients as described above in this oil phase may be from about 10:1 to about 1:2, in some embodiments from about 2:1 to about 1:1.

Where present, an oil phase may be present in an amount of from about 5% to about 20% by weight of a lotion or cream, in embodiments from about 8% to about 15% by weight of a lotion or cream. Lotions or creams formed with the above liposomes may also include a water phase, which may, in embodiments, include the permeation enhancer described above as well as those items combined to form the second phase described above, including humectants and preservatives. Thus, in embodiments, the water phase utilized in formation of a lotion or cream possessing liposomes as described herein may include the second phase described above. In addition, in embodiments it may be desirable to add a viscosity modifier, sometimes referred to herein as a viscosity agent, to provide the lotion and/or cream with a desired viscosity.

Suitable viscosity agents which may be added to the water phase include water soluble polymers, including anionic polymers and nonionic polymers. Useful polymers include vinyl polymers such as cross linked acrylic acid polymers with the CTFA name CARBOMER, pullulan, mannan, scleroglucans, polyvinylpyrrolidone, polyvinyl alcohol, guar gum, hydroxypropyl guar gum, xanthan gum, acacia gum, arabia gum, tragacanth, galactan, carob gum, karaya gum, locust bean gum, carrageenin, pectin, amylopectin, agar, quince seed (*Cydonia oblonga* Mill), starch (rice, corn, potato, wheat), algae colloids (algae extract), microbiological polymers such as dextran, succinoglucan, starch-based polymers such as carboxymethyl starch, methylhydroxypropyl starch, alginic acid-based polymers such as sodium alginate, alginic acid propylene glycol esters, acrylate polymers such as sodium polyacrylate, polyethylacrylate, polyacrylamide, polyethyleneimine, and inorganic water soluble materials such as bentonite, aluminum magnesium silicate, laponite, hectonite, and anhydrous silicic acid. Combinations of the foregoing may also be used in embodiments. In some embodiments, a CARBOMER such as CARBOMER 940 may be added as a viscosity agent to control the rheological properties of the cream formulas and add stability to the primary emulsion.

Where utilized, a viscosity agent may be present in an amount from about 0.1% to about 2% by weight of the composition, in embodiments from about 0.25% to about 0.6% of the composition.

Alternatively, the water phase may contain other soluble humectants such as glycols, polyols, lactate salts, amino acids, peptides, sugars, urea, sodium PCA, hyaluronic acid, or salts thereof, or any other suitable humectant or water soluble or water-dispersible moisturizer within the purview of those skilled in the art. The weight ratio of humectants to permeation enhancer to preservative to viscosity agent may be from about 20:10:1:1 to about 10:20:1:1, in some embodiments from about 15:10:2:1 to about 10:15:1:1.

Thus, as noted above, the water phase utilized to form a lotion and/or cream of the present disclosure may include water, humectants, preservatives, viscosity agents, and permeation enhancers. For example, in embodiments a suitable water phase may include a combination of glycerine, pentylene glycol and/or propylene glycol, ethoxydiglycol, phenoxyethanol, water, and CARBOMER 940.

In some embodiments, the viscosity agent may be added to the water phase as a dispersion in a humectant as described above, optionally in combination with water, optionally in combination with a preservative as described above. For example, in embodiments CARBOMER 940 may be added as a dispersion such as a 2% dispersion containing CARBOMER 940 dispersed in a mixture of water, propylene glycol, and phenoxyethanol. This CARBOMER 940 dispersion may be made separately in a batch manufacturing process. Where a viscosity agent such as CARBOMER 940 is added as a separate dispersion to the water phase, the weight ratio of viscosity agent to humectant to preservative to water may be from about 0.3:2:0.05:10 to about 0.5:1:0.2:10, in some embodiments from about 0.1:0.5:0.05:9 to about 0.2:1:0.1:9.

Where present, a water phase may be present in an amount of from about 60% to about 80% by weight of a lotion or cream, in embodiments from about 63% to about 71% by weight of a lotion or cream.

In some embodiments, a third phase, which may be referred to herein as a neutralization phase or buffer phase, may also be added in the formation of a cream or lotion. The components of such a phase may include, but are not limited to, water, amines including triethanolamine, triisopropanolamine, 2-amino-2methyl-1,3-propanediol, tris(hydroxymethyl)amine, 2-aminobutanol, sodium hydroxide, potassium hydroxide, salts such as sodium lactate, potassium lactate, sodium citrate, potassium citrate, sodium or potassium mono-, di, or tri-phosphate, sodium borate, potassium borate, acids such as lactic acid, citric acid, phosphoric acid, boric acid, combinations thereof, and the like. The water may act as a solvent and a diluent for the other ingredients in this phase. The amine such as triethanolamine may act as a neutralizer of an acid component in the water phase, such as the CARBOMER acrylic acid copolymer; additional salts such as a sodium lactate solution (60% w/w in water) and additional acids such as lactic acid may be added as a buffer system to adjust and maintain the final pH of the cream at from about 4.8 to about 6, in some embodiments from about 5 to about 5.5 (within the natural pH range of the skin). In embodiments, a pH of about 5 or higher may be useful, as the CARBOMER 940 acrylic copolymer of the water phase or similar material should be fully neutralized and develop its full viscosity potential.

In embodiments a suitable amount of amine such as triethanolamine may be added so that it is present in an amount from about 0.5% to about 2% by weight of the final composition, in embodiments from about 1% to about 1.5% by weight of the final composition. A suitable amount of salt such as sodium lactate may be added so that it is present in an amount from about 0.5% to about 3% by weight of the final composition, in embodiments from about 1% to about 1.5% by weight of the final composition. In embodiments, a suitable amount of acid such as lactic acid may be added so that it is present in an amount from about 0% to 1% by weight of the final composition, in some embodiments about 0.25% to about 0.75% by weight of the final composition, in some embodiments about 0.5% by weight of the final composition. The neutralizer and/or buffer may be added so that it is present in an amount from about 0.01% to about 10% by weight of the final composition, in embodiments from about 2% to about 4% by weight of the final composition.

Where present, the neutralizing phase may be present in an amount of from about 0.1% to about 15% by weight of a lotion or cream, in embodiments from about 5% to about 8% by weight of a lotion or cream.

In embodiments, other soluble ingredients may also be added which include, but are not limited to, pH adjusting and buffering agents, tonicity adjusting agents, wetting agents and the like, for example, sodium acetate, sodium chloride, potassium chloride, calcium chloride, sorbitan monolaurate, triethanolamine oleate, and the like. Other buffers which may be added include sodium hydroxide, potassium hydroxide, ammonium hydroxide, monoethanolamine, diethanolamine, triethanolamine, diisopropanolamine, aminomethylpropanol, trimethamine, tetrahydroxypropyl ethylenediamine, citric acid, acetic acid, lactic acid, and salts of lactic acid including sodium lactate, potassium lactate, lithium lactate, calcium lactate, magnesium lactate, barium lactate, aluminum lactate, zinc lactate, sodium citrate, sodium acetate, silver lactate, copper lactate, iron lactate, manganese lactate, ammonium lactate, combinations thereof, and the like. These additives may be added to any phase described above utilized in forming a cream or lotion, including the oil phase, water phase, neutralizing phase, pigment, combinations thereof, and the like.

In embodiments the use of the formulations described above may permit tailoring the production of various compositions having the compound of Formula I at varying concentrations. For example, in embodiments, it may have the compound of Formula I at a concentration of from about 10 to about 15 times greater than the amount of compound of Formula I in a final composition for administration. For manufacturing, a large batch of concentrate may be produced, and then multiple portions of the concentrate may be utilized to produce multiple compositions having the bioactive agent at varying concentrations. This permits great flexibility in tailoring the concentration of a compound of Formula I in a composition of the present invention.

The resulting creams, lotions, and the like may have a long shelf-life; i.e., they may remain stable during storage for at least about 2 years, in embodiments from about 2 to about 10 years.

According to a specific embodiment of the present invention, a cleansing composition or shampoo composition is provided, in particular a cleanser or shampoo for animals including humans, comprising the compound of Formula I, in particular anatabine. The composition can include optionally at least one humectant or moisturizer, at least one surfactant, at least one skin conditioner, at least one hair conditioner, at least one cleansing agent, at least one exfoliant, at least one oil, at least one antioxidant, at least one preservative, at least one emollient (soothing agent), at least one astringent, a fragrance(s), and water.

Some humectants that can be used in a shampoo can also serve as a hair conditioner, and/or a skin conditioner. Some surfactants that can be used can also serve as a hair conditioner, and/or as a foam booster, and/or as a cleansing agent. Some hair conditioners that can be used can also serve as a skin conditioner. Some oils that can be used can also serve as a skin conditioner. Some emollients that can be used can also serve as a skin conditioner. Some antioxidants that can be used can also serve as a skin conditioner. Some astringents that can be used can also serve as a skin conditioner.

Optionally, the composition can also be formulated using a viscosity adjusting agent, e.g., sodium chloride. Optionally, the composition can also be formulated using any commonly used buffer system, if maintaining a certain level of pH is necessary. For example, citric acid can be used to adjust pH.

The total concentration of the moisturizer(s) in the composition can be between about 1 and 10 mass % of the total composition. Some non-limiting examples of moisturizers that can be used include glycerin, honey, and algae extracts. Other non-limiting examples of moisturizers that can be used include urea, sodium lactate, and some amino acids, such as glycine or histidine.

The total concentration of the cleansing agent(s) in the composition can be between about 25 and 40 mass % of the total composition. Some non-limiting examples of cleansing agents that can be used include sodium laurate sulfate, and PEG-80 sorbitan laurate.

The total concentration of the surfactant(s) in the composition can be between about 10 and 20 mass % of the total composition. Some non-limiting examples of surfactants that can be used include sodium $C_{14-16}$ olefin sulfonate, disodium cocoamphodiacetate, and PEG-80 sorbitan laurate.

The total concentration of the skin conditioner(s) in the composition can be between about 2 and 15 mass % of the total composition. Some non-limiting examples of skin conditioners that can be used include glycerin, wheat amino acid, *Lavandula angustifolia* (lavender) extract, PEG-120 methyl glucose trioleate, honey, *Mentha pulegium* extract, *Cucumis sativus* (cucumber) fruit extract, *Camellia siamensis* leaf extract, *Chamomilla recutita* (*matricaria*) flower extract, *Rosmarinus officinalis* (rosemary) leaf extract, tocopheryl acetate, algae extract, and *Hamamelis virginiana* (witch hazel).

The total concentration of the hair conditioner(s) in the composition can be between about 2 and 10 mass % of the total composition. Some non-limiting examples of hair conditioners that can be used include glycerin, disodium cocoamphodiacetate, and wheat amino acid.

The total concentration of the exfoliant(s) in the composition can be between about 0.1 and 1 mass % of the total composition. One non-limiting example of an exfoliant that can be used is bromelain.

The total concentration of the oil(s) in the composition can be between about 0.1 and 2 mass % of the total composition. Some non-limiting examples of an oil that can be used include *Lavandula angustifolia* (lavender) extract and *Cedrus atlantica* (cedarwood) bark oil.

The total concentration of the antioxidant(s) in the composition can be between about 0.1 and 3 mass % of the total composition. Some non-limiting examples of antioxidants that can be used include *Melaleuca alternifolia* (tea tree) leaf oil, *Camellia simensis* leaf extract, and tocopheryl acetate.

The total concentration of the preservative(s) in the composition can be between about 0.1 and 1 mass % of the total composition. Some non-limiting examples of preservatives that can be used include methylisothiazolinone, and methylchloroisothiazolinone.

The total concentration of the emollient(s) in the composition can be between about 0.1 and 2 mass % of the total composition. Some non-limiting examples of emollients that can be used include PEG-120 methyl glucose trioleate, and *Cucumis sativus* (cucumber) fruit extract.

The total concentration of the astringent(s) in the composition can be between about 0.1 and 1 mass % of the total composition. One non-limiting example of an astringent that can be used is *Hamamelis virginiana* (witch hazel).

Any composition satisfying the above-described requirements can be prepared using common formulating techniques known to those having ordinary skill in the art. For example, the above-described components can be mixed with one another, followed by adding water, to form an aqueous composition, e.g., by employing rapid stirring. Alternatively, each component, in a separate container, can be preliminary dissolved in water, or otherwise mixed with water resulting in a plurality of water-based systems, each contained in a separate container. The contents of all the containers can then be combined, e.g., by stirring or shaking, to form the final composition.

If desired, those having ordinary skill in the art can design other methods of mixing the components forming the composition. Regardless of the method of mixing that is selected, those having ordinary skill in the art will provide such quantities of each component so that the concentration of each of the components in the composition satisfies the above-described limits.

A method for the treatment of an animal is further provided. A composition can be prepared according to a procedure described above, optionally followed by washing the animal. The composition can be then applied topically onto the skin of an animal that needs protection against ectoparasites. Various methods can be used for applying the composition onto the skin of an animal. For example, the composition can be sprayed using a conventional hand-operated pump. Alternatively, the composition can be formulated to form an aerosol using commonly known methods for aerosol preparation. Those having ordinary skill in the art can devise other methods for applying the composition.

The present invention also provides for a method for protecting objects from infestation, in particular infestation with insects or arachnids, including insects or arachnids that are ectoparasites. The method, in one embodiment, may comprise contacting or covering the surface of the object with a treatment composition comprising the compound of Formula I, in particular anatabine. Contacting or covering the surface of the object may be achieved, for example, by employing a spraying device comprising the treatment composition of the invention. As such, the invention also provides insect-repellent objects or arachnid-repellent objects, such as for example fabrics or clothes. The fabrics have insect repellent molecules absorbed in the fibers of the fabrics. The fabrics are suitable for use in clothing and, more particularly, are suitable for use in protective garments designed to be worn by individuals, who may be at risk of exposure to insects, in particular ectoparasites. The repellent compounds of the invention may be incorporated into the fabrics in a variety of ways including, but not limited to, immersing the fibers or fabrics in a bath containing the compound of Formula I, providing a spray to the fibers or fabrics or washing the fibers or fabrics. Within the present invention, amounts of the formulation of the invention to the fibers or fabrics may be varied by the skilled person in order to achieve the desired effect of reducing infestation with ectoparasites. It is preferred within the present invention to use amounts sufficient to achieve concentrations of at least 5, 10, 15, 20, 25, 30, 40, 50, 60, 70, 80, 90, or 100 $\mu mol/m^2$ of the formulation or compounds of the invention on the fibers or fabrics. It is furthermore preferred within the present invention to use amounts of up to 300 $\mu mol/m^2$ of the formulation or compounds of the invention on the fibers or fabrics. In particular, it is preferably to use an amount sufficient to achieve protection against ectoparasites for 0.1 day to 30 days, particularly for 1 h to 48 h, most particularly from 4 h to 8 h.

In further embodiments, the topical formulation of the present invention comprising a compound of Formula I, in particular anatabine may be in the form of a lotion, cream, ointment, gel, foam, patch, powder, solid, sponge, tape, vapor, paste or tincture. A further example is anatabine in the form of a liquid, such as a solution.

The following examples describe the invention further, without limiting it to the content of the examples.

EXAMPLES

1. Organisms 1.1 Tobacco Plants

Description of the *Nicotiana* species and varieties are given in Table 1. Selection was based on their alkaloid content previously known from inventors' data and literature, and on plant availability at the facility,

TABLE 1

Plant characteristics and related crude extract denomination

| Plant species | Strain | Origin | Major alkaloid | Tobacco leaf extract ID |
|---|---|---|---|---|
| Nicotiana tabacum | PMT | Greenhouse | Anatabine | PMT |
| N. tabacum | Stella (burley) | Field | Nicotine | Stella |
| N. tabacum | K326 (Virginia) | Greenhouse | Nicotine | K326 |
| N. tabacum | TN90 (burley) | Greenhouse | Nicotine | TN90 |
| N. tabacum | ITB 683 (Virginia) | Field | Nicotine | ITB 683 |
| N. glutinosa | Wild species | Greenhouse | Nornicotine | Glutinosa |
| N. glauca | Wild species | Greenhouse | Anabasine | Glauca |
| N. debneyi | Wild species | Greenhouse | Anabasine | Debneyi |

1.2 Ticks for Bioassays

*R. sanguineus* ticks were purchased as fully engorged females or adult unfed ticks from Ecto Services Inc. (Henderson, NC, USA). For egg-laying and larval development, females were maintained at 28° C. and 80% relative humidity. Hatched larvae and adult ticks were kept under the same environmental conditions until use.

*Ixodes ricinus* nymphs were purchased at Insect Service GmbH, (Berlin, Germany), and kept at 28° C. and 80% relative humidity until use.

2. Plant Cultivation

Seeds of *N. tabacum* TN90 and K326 cultivars as well as *N. glauca*, *N. glutinosa*, and *N. debneyi* were obtained from inventors' seed storage. The transgenic TN90 line PMT (06TN2048) was obtained from Altria Client Services LLC (Richmond, VA, USA). PMT lines were produced using *Agrobacterium*-mediated transformation as described in patent WO2015157359A1. Seeds were sown into soil-containing floating trays. Well-developed plantlets were transferred to 5-L pots and cultivated under a 16/8-h artificial light/dark photoperiod until fully grown.

At the time of flowering, all plants were topped. Two weeks after topping, representative, fully-grown leaves were sampled from each plant. All samples were immediately used for crude extract preparation in methanol.

For field cultivation, seeds of *N. tabacum* Stella (burley tobacco) and *N. tabacum* ITB 683 (Virginia tobacco) were obtained from local source and sown into soil-containing floating trays, grown in the greenhouse, and transplanted to the field according to tobacco agricultural practices. Plantlets were planted at a density of 24,000 per hectare in western Switzerland (canton de Vaud). Leaf samples were collected from fully mature plants 2 weeks after topping and immediately transported to the laboratory for crude methanol extract preparation.

3. Crude Extract Preparation

All plant leaves were oven-dried at 60° C. for 24 h and disrupted by shaking with glass beads at 400 rpm for 8 h. For each selected tobacco variety/species, 2 g of ground leaf powder were placed in 50-mL glass bottles. Twenty milliliters of methanol (HPLC-grade, ≥99.9% purity, Sigma-Aldrich, St. Louis, MO, USA) were added to the ground leaves. The mixture was then sonicated (Branson 3510-DTH Ultrasonic Cleaner; Danbury, CT, USA) for 30 min and decanted into a filter column holding a Whatman® filter paper (125 mm Ø, cellulose paper; Maidstone, UK). The filtrate was sonicated with 20 mL of methanol and filtered again. The resulting filtrate was then placed into a rotary evaporator to remove the solvent and the remaining extract was further lyophilized (Labconco cat. no. 7934030; Kansas City, MO, USA) for 16 h until all water was removed. Methanolic leaf extracts were prepared at either AnalytiCon Discovery GmbH (Potsdam, Germany) or internally, following the same extraction procedure.

4. Alkaloid Quantification in Tobacco Crude Extracts

Samples for pyridine alkaloid (nicotine, nornicotine, anatabine, anabasine, cotinine, and myosmine) analysis by ultra-high-performance liquid chromatography coupled with mass spectrometry (UHPLC-MS) were prepared by dissolving approximately 25 mg of crude extract in water/methanol (3:7, with 500 ng/mL quinoline as internal standard; 5 mL), filtering (Fisherbrand™ Sterile PES Syringe Filter with pore size of 0.2 µm; Thermo Fisher Scientific, Waltham, MA, USA), and diluting 1:200 with the extraction mixture. A simultaneous determination of all six alkaloids was performed on an Ultimate 3000 UHPLC system coupled to a Q-Exactive mass spectrometer (Thermo Fisher Scientific). Chromatographic separation was performed on an Acquity HSS T3 column (1.7 µm, 100×2.1 mm; Waters, Milford, MA, USA); the column temperature was set to 45° C. Eluents were ammonium acetate in water (10 mM; pH 8.9; eluent A) and ammonium acetate in methanol (10 mM; eluent B) applied as a gradient (0 min 10% B; 0.25 min 10% B; 4.25 min 98% B; 5.25 min 98% B; flow: 0.5 mL/min). The injection volume was 5 µL. Nicotine, nornicotine, anabasine, anatabine, cotinine, and myosmine were eluted for 3.89, 2.76, 3.27, 3.36, 2.62, and 3.47 min, respectively, and detected as [M+H]+ pseudomolecular ions after positive electrospray ionization. The concentration of each target alkaloid was expressed in milligrams per gram of dry weight. The molar concentration of the target alkaloids in the crude extract was calculated for the concentrations of the crude extracts used in the tick repellent test, and was expressed in micromoles per square meter according to the following formula:

5. Compounds 5.1 Tobacco Alkaloids

Tobacco pure alkaloids were used in the tick repellent/knockdown contact test to characterize the activity observed with the tobacco leaf extracts. (S)-Nicotine, (S)-nornicotine, (S)-anabasine, (S)-cotinine, and myosmine standards were purchased from Sigma-Aldrich. (S)- and (R)-anatabine enantiomers were synthesized by WuXi AppTec Co., Ltd. (Shanghai, China) (Table 2).

TABLE 2

Selected tobacco alkaloids. MW, molecular weight

| | chemical structure | name | MW |
|---|---|---|---|
| 1 | | (S)-nicotine | 162.23 |
| 2 | | (S)-nornicotine | 148.21 |
| 3 | | (S)-anabasine | 162.23 |
| 4 | | (S)-anatabine dihydrochloride | 233.14 |
| 5 | | (R)-anatabine dihydrochloride | 233.14 |
| 6 | | (S)-cotinine | 176.22 |
| 7 | | myosmine | 146.19 |

Racemic anatabine was obtained according to a modified procedure described in Deo and Crooks (1996) Tetrahedron Letters 37(8), pp. 1137-1140. The (S)- and (R)-enantiomers were separated by chiral supercritical fluid chromatography and converted into hydrochloride salts for improved alkaloid stability.

Stock solutions of the alkaloids were prepared as 20 millimolar (mM) solutions in ethanol immediately prior to use. Stock solutions were kept at 22° C. in the dark for longer-term storage.

5.2 Bioassay Positive Controls

Positive control N—N-diethyl-m-toluamide [DEET]) used in the bioassays were obtained from Merck (Kenilworth, NJ, USA).

6. Bioassay

Concentrations of the extracts in the bioassays were selected according to the organisms' upper limit of DMSO tolerance, or specific bioassay constraints. Positive controls were tested at their minimum effective concentration.

6.1 Tick Repellent/Knockdown Contact Test

The assay is used to evaluate the repellent/deterrent potential of a test compound or extract. The test includes a preliminary assessment of knockdown efficacy as a secondary endpoint. Knockdown can be defined as a state of intoxication and paralysis that usually precedes death (Wickham et al. (1974) Pesticide Science 5(5): 657-664). The test relies on the questing behavior of ticks that explore their habitat to find a suitable host hunting site and their propensity to avoid areas treated with repellent or irritating substances. Tick knockdown is expressed as a reduction in total motility over a defined period of time, and not by collecting and counting the number of dead and live ticks at the end of the exposure period.

Plant extracts or synthetic pure alkaloids diluted in methanol (extracts) or ethanol (alkaloids) were deposited on the bottom of wells in a six-well plate. Only one quadrant (2.54 cm2) of the bottom surface of each well was treated. The solvent was left to evaporate. The final concentration of the plant extracts was, therefore, expressed in $mg/m^2$, or in micromoles per square meter ($\mu mol/m^2$) for the synthetic alkaloids. Final concentrations applied for plant extracts were 893 (R. sanguineus adults only), 446, 141, 44.6, 14.1, and 4.46 $mg/m^2$, and 300, 100, 30, 10, and 3 $\mu mol/m^2$ for pure alkaloids. Approximately 50 R. sanguineus tick larvae, and exactly 5 R. sanguineus adults, or 5 I. ricinus nymphs were added to the untreated area of each well. Positive (DEET, commercial tick repellent) and negative (methanol or ethanol) controls were evaluated in parallel. Each concentration tested was run in three or more test replicates. After a 1-min incubation on a heating plate, the frequency of tick movement in the treated quadrant and in each of the untreated quadrants was recorded by machine vision. Tick movement on the untreated surface was computed as the median of movement on the three untreated quadrants. To estimate deterrence recordings were performed over a period of 2 min for R. sanguineus larvae, and for 3 minutes for R. sanguineus adults and I. ricinus nymphs, after the 1-min pre-exposure period. To assess knockdown effect, recording was extended to 9 min (starting at the 1-min pre-exposure period and lasting an additional 8 minutes).

Deterrence activity was calculated as follows:

Percent deterrence=1−(movements on treated area/movements on untreated area)×100.

A difference of 50% between total movements recorded in the treated area versus movements recorded in the untreated area was considered significant.

The tick knockdown effect was calculated similarly:

Percent knockdown=1−(movements at the end of the imaging period/movements at the beginning of the imaging period)×100.

A difference of 50% between total movements recorded during the 1 min pre-exposure and total movements measured at 9 min of recording was considered significant.

6.2 Statistical Analysis

The median of replicate measurements of the parasiticidal activity observed with the tobacco crude extracts was used in the statistical analysis (SAS 9.2, SAS Institute Inc., NC, USA). As a first step a multicollinearity analysis was performed and led to the exclusion of cotinine in the further statistical analysis. Then linear models were used with a stepwise inclusion of predictors, as well as their second order interaction, to predict the role of the alkaloid in the observed efficacy.

7. Results

7.1 Quantification of Selected Alkaloids in Tobacco Extracts

The species in genus *Nicotiana*, including *N. tabacum* varieties, accumulate alkaloids to various extents. Among the multitude of tobacco constituents (carbohydrates, amino acids, pyridine alkaloids, pigments, isoprenoids, terpenoids, carboxylic acids, polyphenols, sterols, and inorganic compounds, alkaloids trigger particular interest due to the antiparasitic history of nicotine. To understand if alkaloids would play a role in the biological activity observed against ticks, and which alkaloid may be responsible for this efficacy, we quantified the main pyridine alkaloids in the selected tobacco plants (nicotine, nornicotine, anabasine, anatabine, cotinine, and myosmine) using UHPLC-MS (Table 3).

To understand the potential role of the major alkaloids in the tobacco crude extracts tested for anti-tick activities, we analyzed full dose curve responses with the pure alkaloids (S)-nicotine, (S)-nornicotine, (S)-anabasine, and (S)- and (R)-anatabine in the tick repellent/knockdown bioassay. To establish an appropriate concentration range for this assay, the quantity of each alkaloid measured in each extract dilution (4.46-893 mg/m$^2$) was transformed into molar concentrations. Alkaloid concentration ranges in the crude extracts were 1-596 µmol/m$^2$ nicotine, 0.14-28.8 µmol/m$^2$ nornicotine, 0.024-27.6 µmol/m$^2$ anabasine, and 0.5-93 µmol/m$^2$ anatabine.

7.2 Parasite Bioassays with Tobacco Leaf Crude Extracts

All eight tobacco leaf extracts showed significant repellent activity against *R. sanguineus* larvae over several dilutions (FIG. 3A). Five extracts (Stella, K326, TN90, ITB 683, and *glauca*) had minimum effective concentrations similar to or lower than those of the positive control DEET. Moreover, Stella and TN90 rapidly knocked down 74% and 77% of tick larvae, respectively, at a concentration of 446 mg/m$^2$. At same concentration, two other extracts, K326 and ITB 683, knocked down 42% and 48% of the ticks, respectively.

Concentration curve responses for all extracts were bell shaped, and the highest concentration (446 mg/m$^2$) was not the most effective. Although the knockdown activity exhibited by half of the extracts could have influenced tick

TABLE 3

Pyridine alkaloid concentrations in tobacco extracts expressed as milligrams per gram of crude extract weight

| Extract | Alkaloid | | | | | |
|---|---|---|---|---|---|---|
| | Nicotine | Nornicotine | Anabasine | Anatabine | Cotinine | Myosmine |
| PMT | 3.95 (18.12) | 0.3 (1.37) | 0.78 (3.56) | 16.68 (76.55) | 0.04 (0.2) | 0.04 (0.2) |
| Stella | 108.38 (93.47) | 1.88 (1.62) | 1.01 (0.87) | 4.55 (3.92) | 0.1 (0.09) | 0.03 (0.02) |
| K326 | 48.93 (92.87) | 0.96 (1.82) | 0.55 (1.04) | 2.16 (4.09) | 0.07 (0.14) | 0.02 (0.04) |
| TN90 | 90.9 (92.67) | 1.45 (1.48) | 1.1 (1.12) | 4.48 (4.57) | 0.11 (0.11) | 0.06 (0.06) |
| ITB 683 | 38.82 (87.8) | 0.47 (1.07) | 1.65 (3.73) | 3.18 (7.19) | 0.06 (0.13) | 0.04 (0.08) |
| Glutinosa | 11.02 (65.24) | 4.78 (28.32) | 0.27 (1.6) | 0.55 (3.23) | 0.22 (1.31) | 0.05 (0.31) |
| Glauca | 4.67 (46.76) | 0.15 (1.47) | 5.02 (50.28) | 0.09 (0.95) | 0.03 (0.26) | 0.03 (0.28) |
| Debneyi | 6.57 (81.25) | 0.37 (4.59) | 0.88 (10.93) | 0.07 (0.92) | 0.1 (1.19) | 0.09 (1.11) |

Values in parentheses denote the percentage composition of all measured alkaloids. The value of the major pyridine alkaloid in each plant extract is in bold.

Nicotine was the major alkaloid in crude extracts of *N. tabacum* field-grown Stella and ITB 683, and in the greenhouse-grown TN90 and K326 varieties. Anatabine was the major alkaloid in the crude extract of the transgenic *N. tabacum* TN90 PMT line, but nicotine was also present in this variety (18.1%). The highest concentration of nornicotine (4.78 mg/g) was measured in the *N. glutinosa* extract (*glutinosa*), but nicotine (11.02 mg/g) was the major alkaloid in this extract. The highest concentration of anabasine was found in the *N. glauca* extract (*glauca*, 5.02 mg/g), but nicotine was present in this extract at a similar quantity and proportion. Anabasine was also relatively highly concentrated as a portion of total measured alkaloids in the *N. debneyi* extract (*debneyi*, 0.88 mg/g), although nicotine was the major compound (6.57 mg/g).

motility during repellence recording and biased the evaluation of repellence, this effect was also observed in extracts without knockdown activity. In the bioassay, ticks were restricted to a closed area without possibility to escape. At high concentrations, a tobacco extract deposited on one quadrant of the test well could influence bigger parts of the well, and depending of the vapor pressure of its multiple constituents, could saturate the total atmosphere of the well. Exposed ticks would try to escape this irritant environment without finding an exit, hence generating more movements in the well, including in the treated surface.

Based on these positive results, the eight tobacco leaf extracts were further tested against adult *R. sanguineus* (FIG. 2B, Tables 6 and 7) and nymphs of *I. ricinus* (FIG. 2C) to evaluate their spectrum of activity on other tick stages and species.

Figure 2B:
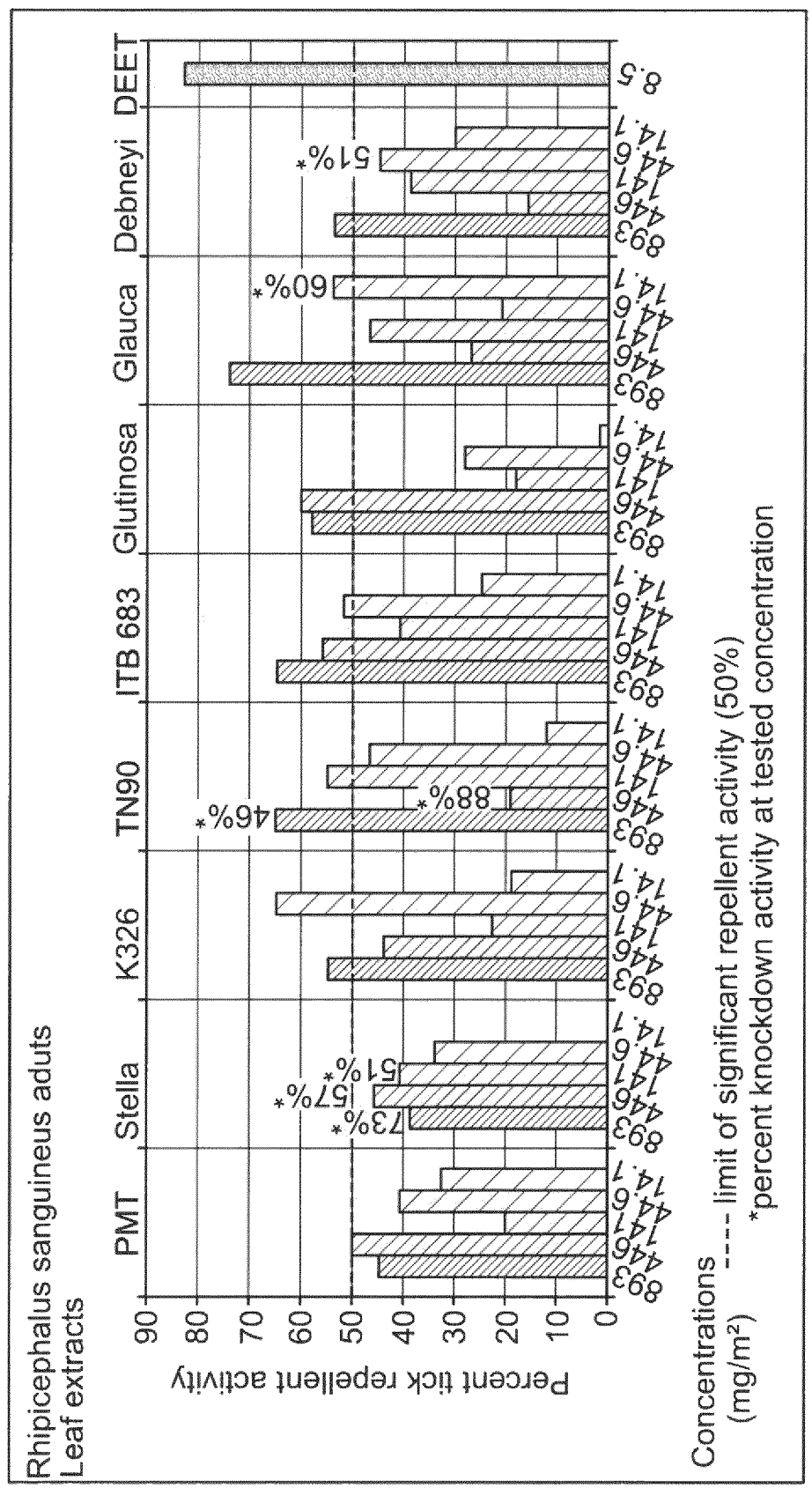
Figure 2C:
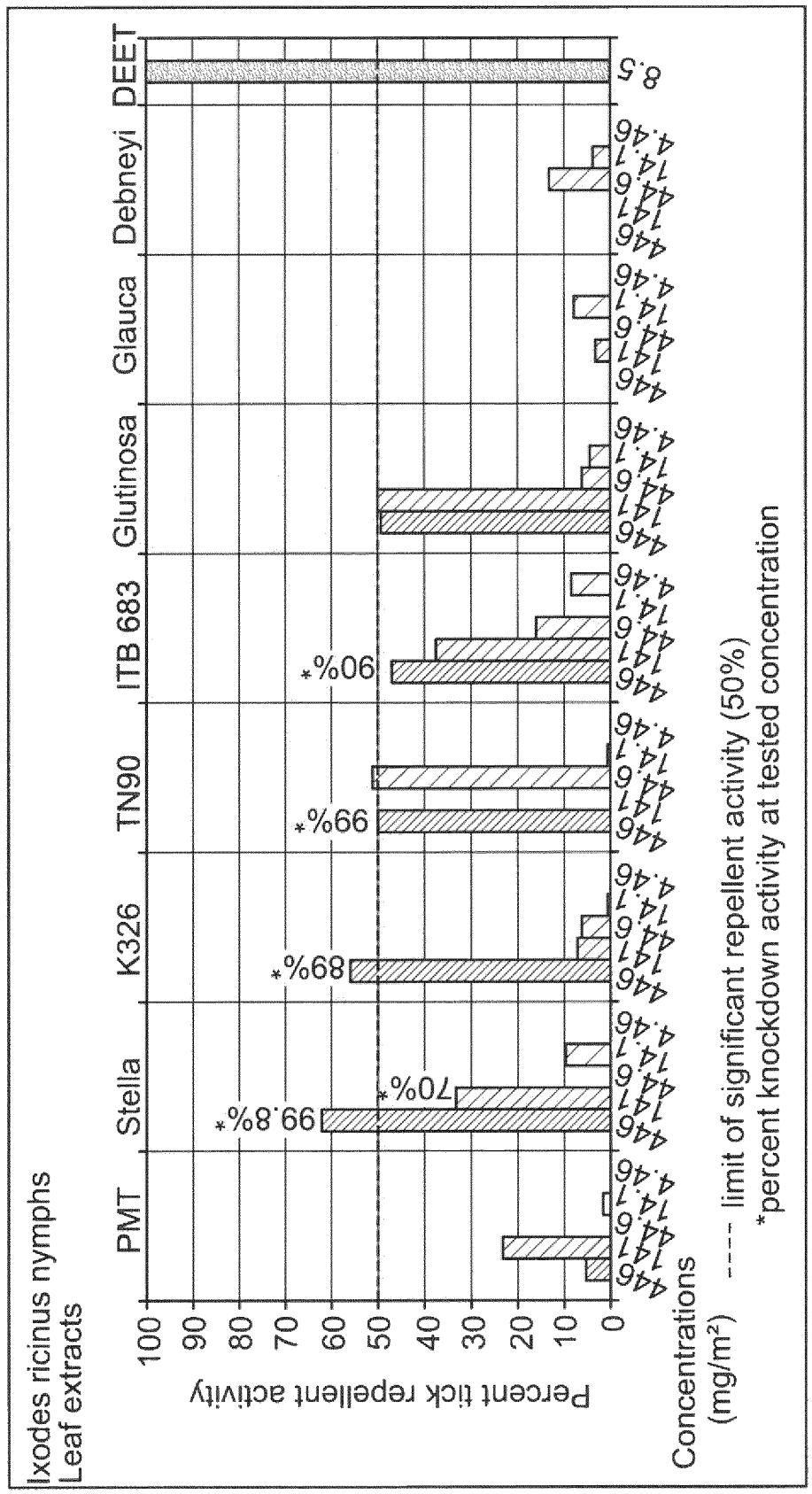

In *R. sanguineus* adult ticks (FIG. 2B), the repellent activity of the extracts was generally lower than that observed with larvae (FIG. 2A). Six extracts, K326, TN90, ITB 683, *glutinosa, glauca,* and *debneyi* exhibited significant repellence at the highest concentration of 893 mg/m$^2$. The minimum effective concentrations based on the median efficacy was 141 mg/m$^2$ for TN90, 44.6 mg/m$^2$ for K326 and ITB 683, and 14 mg/m$^2$ for *glauca*. Tick knockdown was observed with Stella extract over three concentrations (893 to 44.6 mg/m$^2$), and with TN90 at 893 and 446 mg/m$^2$. Tick knockdown also occurred with *glauca* and *debneyi* extracts, at 14 mg/m$^2$ and 44.6 mg/m$^2$, respectively.

In the *I. ricinus* nymph ticks bioassay (FIG. 2C), few extracts exerted significant tick repellence. Stella and K326 were active at 446 mg/m$^2$ and TN90 at 44.6 mg/m$^2$. In addition, *glutinosa* showed borderline activity over two concentrations (446, and 141 mg/m$^2$). Tick knockdown was, on the contrary, very high (between 89% and 99.8%) in Stella, K326, TN90, and ITB 683 at the highest tested concentration of 446 mg/m$^2$, and seventy percent of the ticks were still affected by 141 mg/m$^2$ TN90 leaf extract.

7.3 Tick Repellent/Knockdown Efficacy of Selected Pure Alkaloids Against *R. sanguineus* Larvae (S)-nicotine, (S)-nornicotine, (S)-anabasine, and anatabine (S) and (R) isomers were tested at 300, 100, 30, 10, and 3 µmol/m$^2$, covering most of the concentrations measured in the eight tobacco leaf extracts. Cotinine and myosmine were not considered for testing, as they constituted not more than 1.3% of the total alkaloid content of the extracts (see Table 3). Three independent test sets with triplicates were generated (Table 4). All pure alkaloids, with the exception of (S)-anabasine, exhibited repellent activity against *R. sanguineus* larvae at 300 µmol/m$^2$. Interestingly, (S)-anabasine was more active at 100 µmol/m$^2$ with a median of 58% activity. (S)-nornicotine was only active at the highest tested concentration of 300 µmol/m$^2$ (81% activity). The best tick repellent effects were observed with (R)-anatabine (62% at 30 µmol/m$^2$, 84% at 100 µmol/m$^2$) and (S)-anatabine (54% at 30 µmol/m$^2$, 86% at 100 µmol/m$^2$). At 30 µmol/m$^2$, (S)-nicotine and (R)-anatabine still exerted 55% and 62% repellence, respectively. These results were comparable with the effects of the positive control DEET at same concentration, the median percentage of activity for DEET being 64% at 30 µmol/m$^2$. DEET, however, remained more active at 10 µmol/m$^2$ than the two isomers of anatabine, with a median of 57% (versus medians of 34% and 38% for (R)- and (S)-anatabine, respectively).

(S)-nicotine and (R)-anatabine effectively knocked down *R. sanguineus* larvae at 300 µmol/m$^2$ (medians of 95% and 53%, respectively) (Table 4). At 100 µmol/m$^2$, the median activity of (R)-anatabine was still 55%, but dropped down below the limit of significance for nicotine with a median of 37%. No other significant tick knockdown effect could be observed with the other pure alkaloids.

TABLE 4

Repellent and knockdown activity of pure tobacco alkaloids against *R. sanguineus* tick larvae

| | | Repellence | | | Knockdown | | |
|---|---|---|---|---|---|---|---|
| Compound | Concentration [µmol/m$^2$] | Median (Q1-Q3) [%] | N | Minimum effective concentration [µmol/m$^2$] | Median (Q1-Q3) [%] | N | Minimum effective concentration [µmol/m$^2$] |
| (S)-nicotine | 300 | 56.2 (36.5-81.9) | 9 | 300-30 | 94.5 (80.3-100) | 9 | 300 |
| | 100 | 27.8 (0-67.9) | 6 | | 37.1 (10.2-73.9) | 6 | |
| | 30 | 55.0 (13.6-85.0) | 9 | | 26.4 (2.1-42.4) | 9 | |
| | 10 | 41.8 (36.7-53.0) | 6 | | 1.3 (0.2-18.1) | 6 | |
| | 3 | 18.1 (3.2-27.3) | 6 | | 3.4 (0-9.9) | 6 | |
| (S)-nornicotine | 300 | 81.1 (70.1-93.1) | 9 | 300 | 18.7 (8.8-48.6) | 9 | >300 |
| | 100 | 42.2 (20.4-68.3) | 6 | | 9 (6.45-18.7) | 6 | |
| | 30 | 27.9 (4.5-81.9) | 9 | | 9.9 (6.4-13.3) | 9 | |
| | 10 | 35.3 (27.3-48.5) | 6 | | 0.4 (0-17.2) | 6 | |
| | 3 | 12.3 (2.2-18.4) | 6 | | 0.7 (0.1-7.8) | 6 | |
| (S)-anabasine | 300 | 40.5 (11.1-65.1) | 9 | >300-100 | 9.5 (6.7-14.4) | 9 | >300 |
| | 100 | 58.0 (55.2-63.1) | 6 | | 6.0 (0.9-9.0) | 6 | |
| | 30 | 46.9 (30.4-92.6) | 9 | | 10.4 (7.5-24.4) | 9 | |
| | 10 | 42.4 (28.8-60.8) | 6 | | 6.9 (0.9-13.2) | 6 | |
| | 3 | 6.6 (0.7-18.0) | 6 | | 0 (0-0) | 6 | |
| (S)-anatabine dihydrochloride | 300 | 79.8 (72.6-83.8) | 9 | 30 | 14.2 (0-24.0) | 9 | >300 |
| | 100 | 86.2 (66.5-99.3) | 6 | | 23.8 (18.6-32.8) | 6 | |
| | 30 | 54.4 (34.7-58.5) | 9 | | 14.7 (3.2-21.2) | 9 | |
| | 10 | 38.1 (28.1-49.4) | 6 | | 4.2 (2.4-12.6) | 6 | |
| | 3 | 38.4 (26.3-46.9) | 6 | | 0 (0-10.1) | 6 | |
| (R)-anatabine dihydrochloride | 300 | 88.3 (79.6-94) | 9 | 30 | 52.7 (32.8-60.1) | 9 | 100 |
| | 100 | 84.3 (77.5-87.8) | 6 | | 54.5 (35.2-61.2) | 6 | |
| | 30 | 62.0 (37.8-69.1) | 9 | | 11.1 (1.3-16.8) | 9 | |
| | 10 | 34.4 (24.3-49.2) | 6 | | 7.5 (0-26.0) | 6 | |
| | 3 | 20.8 (3.5-32.8) | 6 | | 0 (0-0) | 6 | |

TABLE 4-continued

Repellent and knockdown activity of pure tobacco alkaloids against R. sanguineus tick larvae

| | | Repellence | | | Knockdown | | |
|---|---|---|---|---|---|---|---|
| Compound | Concentration [μmol/m$^2$] | Median (Q1-Q3) [%] | N | Minimum effective concentration [μmol/m$^2$] | Median (Q1-Q3) [%] | N | Minimum effective concentration [μmol/m$^2$] |
| DEET | 300 | 100 (100-100) | 9 | 10 | 11.1 (3.1-17.7) | 9 | >300 |
| | 100 | 75.7 (67.5-86.8) | 6 | | 5.2 (0.8-17.3) | 6 | |
| | 30 | 63.9 (55.3-94.5) | 9 | | 2.4 (0-6.4) | 9 | |
| | 10 | 57.3 (42.6-65.1) | 6 | | 10.0 (4.4-15.2) | 6 | |
| | 3 | 31.1 (28.1-32.2) | 6 | | 0.7 (0-17.2) | 6 | |
| Ethanol | Solvent control | 9.7 (0-24.5) | 27 | nd | 13.4 (5.4-26.6) | 28 | nd |

Q1, first quartile (25%) of the dataset. Q3, third quartile (75%) of the dataset. N, number of test replicates, nd, not determined. The minimum effective concentration is the smaller concentration for which the calculated median of activity is greater than the limit of activity significance (50%). The percentage values exceeding the limit of activity significance are bolded.

7.4 Contribution of the Tobacco Major Alkaloids in Tick Repellence/Knockdown Activity of the Leaf Extracts, Statistical Analysis Tobacco plant alkaloid content is influenced by many factors, such as plant variety, batch, growing conditions in greenhouse, location, air pollution and weather conditions for field varieties, storage and drying conditions. Crude leaf extracts derived from those plants are very complex mixtures with unknown interactions between constituents. All contribute to the variability observed in the bioassays, making an assessment of the role of individual constituents of the leaf extracts very difficult. Keeping in mind those limitations, we investigated the hypothetical contribution of the major alkaloids quantified in the eight different tobacco leaf extracts in the activity observed in the tick repellent/knockdown bioassay. Data from R. sanguineus larvae and adults, and from I. ricinus nymph ticks bioassays were combined and analyzed using linear statistical models. Tick species and stage influence on the activity of the leaf extracts was also evaluated. Due to variability within the three replicates, the median was used in the statistical analysis for tick repellence and knockdown.

In the linear model used to predict knockdown activity, nicotine explained 35% of the variance of the model and was significantly correlated with the knockdown activity of the leaf extracts (p<0.0001). Tick species and stage modestly influenced the model, explaining only 2.3% of the variance (p<0.05). In the linear model used to predict repellence, no alkaloid could be identified as predominantly influencing the activity observed with the extracts tested. However, tick species and stage significantly impacted the repellent activity of the extracts, being responsible of 51% of the variance of the model (p<0.0001).

For nicotine, the outcome of the model was in accordance with the results obtained with the pure alkaloid, although only tested against R. sanguineus tick larvae (see Table 4). Pure (S)-nicotine knocked down 95% of the tick larvae at 300 μmol/m$^2$ (48.7 mg/m$^2$) and 37% at 100 μ/m$^2$ (16.2 mg/m$^2$), as was also observed in the crude extracts exerting lethal effects at 446 mg/m$^2$ against the same tick species and stage (TN90: 77%, 40.5 mg/m$^2$ nicotine; Stella: 74%, 48.3 mg/m$^2$ nicotine; K326: 42%, 21.8 mg/m$^2$ nicotine; ITB 683: 48%, 17.3 mg/m$^2$ nicotine). The knockdown effect of the leaf extracts containing high levels of nicotine was also observed at 446 mg/m$^2$ against R. sanguineus adults (Stella and TN90) and I. ricinus nymphs (Stella, K326, TN90, and ITB 683).

Although (R)-anatabine as a pure compound displayed significant knockdown activity at 300 and 100 μmol/m$^2$, anatabine was not identified in the model to have an influence on the effect observed with the leaf extracts. Anatabine was not analyzed in the statistical model as two separate enantiomers, but as a racemate this alkaloid was only accounting for 13.1 μmol/m$^2$ in Stella, 11.1 μmol/m$^2$ in TN90, 7.9 μmol/m$^2$ in ITB 683, and 5.35 μmol/m$^2$ in K326, at a leaf extract concentration of 893 mg/m$^2$, namely ten times below the minimum effective concentration limit of the pure alkaloid. In addition, no particular knockdown effect could be observed in the anatabine-rich PMT leaf extract, for the same reasons.

In terms of repellence, the minimum effective concentrations of the extracts ranged from under 4.7 mg/m$^2$ to 44.6 mg/m$^2$ for R. sanguineus larvae. Alkaloids tested as pure compounds were generally not active at concentrations equivalent to those measured in the crude extracts (molarity of the corresponding alkaloid at crude extract minimum inhibitory concentration: 3 μmol/m$^2$ nicotine, 0.45 μmol/m$^2$ nornicotine, 0.14 μmol/m$^2$ anabasine, and 4.7 μmol/m$^2$ anatabine). As repellence exerted by the leaf extracts was lower by a factor of 3 to 10 against R. sanguineus adults, and almost never reached the bioassay significance limit against I. ricinus nymphs, no comparison of activity could be drawn between leaf extracts and pure alkaloids. This difference in sensitivity between tick species and stages was also strongly pointed out by the statistical model.

Among the tested pure alkaloids, (S)-anatabine and (R)-anatabine exhibited the lowest minimum effective concentration against R. sanguineus larvae, close to that of DEET. (R)-anatabine also significantly knocked down ticks at 300 and 100 μmol/m$^2$.

TABLE 5

Efficacy of alkaloid compounds (anatabine*HCl, N = 3, subset of data shown in Table 4)

| Compound | Dose | % mortality | % repellency | MEC (μmol/m$^2$) |
|---|---|---|---|---|
| Nicotine | 300 | 99 | — | 30 |
| | 30 | 33 | 56 | |
| | 3 | 11 | 23 | |
| Nornicotine | 300 | 49 | 70 | 300 |
| | 30 | 11 | 5 | |

TABLE 5-continued

Efficacy of alkaloid compounds (anatabine*HCl, N = 3, subset of data shown in Table 4)

| Compound | Dose | % mortality | % repellency | MEC (μmol/m²) |
|---|---|---|---|---|
| Anatabine R | 300 | 24 | 97 | 30 |
|  | 30 | — | 62 |  |
|  | 3 | — | 0 |  |
| Anatabine S | 300 | — | 78 | 300 |
|  | 30 | — | 12 |  |
| Anabasine | 300 | 14 | 9 | >300 |
| DEET | 300 | 11 | 100 | 300 < MEC > 30 |
|  | 30 | — | 26 |  |
|  | 3 | — | 27 |  |
| EtOH | Solvent control | 11 | 0 |  |

TABLE 6

Efficacy of tobacco extracts (1)

| Extract | Dose | % mortality | MEC (Mortality) | % Repellency | MEC (Repellency) (mg/m²) |
|---|---|---|---|---|---|
| EXT 10112 (PMT) | 446 | 7 | >446 | 50 | 44.6 |
|  | 141 | 0 |  | 56 |  |
|  | 44.6 | 4 |  | 70 |  |
|  | 14 | 5 |  | 42 |  |
|  | 4.46 | 0 |  | 35 |  |
| EXT 10113 Stella (Field) | 446 | 74 | 446 | 74 | <4.46 |
|  | 141 | 0 |  | 56 |  |
|  | 44.6 | 0 |  | 81 |  |
|  | 14 | 5 |  | 51 |  |
|  | 4.46 | 0 |  | 53 |  |
| Ext 10114 (Glutinosa) | 446 | 0 | >446 | 62 | 14 |
|  | 141 | 0 |  | 73 |  |
|  | 44.6 | 0 |  | 49 |  |
|  | 14 | 0 |  | 69 |  |
|  | 4.46 | 0 |  | 44 |  |
| Ext 10115 (N. glauca) | 446 | 3 | >446 | 51 | <4.46 |
|  | 141 | 3 |  | 69 |  |
|  | 44.6 | 0 |  | 51 |  |
|  | 14 | 0 |  | 72 |  |
|  | 4.46 | 0 |  | 68 |  |
| DEET | 8.5 | — | — | 81.6 | 8.5 |
| MetOH |  | — | — | 13 | — |

TABLE 7

Efficacy of tobacco extracts (2)

| Extract | Dose | % mortality | MEC (Mortality) | % Repellency | MEC (Repellency) (mg/m²) |
|---|---|---|---|---|---|
| EXT 10112 (PMT) | 446 | 7 | >446 | 50 | 44.6 |
|  | 141 | 0 |  | 56 |  |
|  | 44.6 | 4 |  | 70 |  |
|  | 14 | 5 |  | 42 |  |
|  | 4.46 | 0 |  | 35 |  |
| EXT 10113 Stella (Field) | 446 | 74 | 446 | 74 | <4.46 |
|  | 141 | 0 |  | 56 |  |
|  | 44.6 | 0 |  | 81 |  |
|  | 14 | 5 |  | 51 |  |
|  | 4.46 | 0 |  | 53 |  |
| Ext 10114 (Glutinosa) | 446 | 0 | >446 | 62 | 14 |
|  | 141 | 0 |  | 73 |  |
|  | 44.6 | 0 |  | 49 |  |
|  | 14 | 0 |  | 69 |  |
|  | 4.46 | 0 |  | 44 |  |
| Ext 10115 (N. glauca) | 446 | 3 | >446 | 51 | <4.46 |
|  | 141 | 3 |  | 69 |  |
|  | 44.6 | 0 |  | 51 |  |
|  | 14 | 0 |  | 72 |  |
|  | 4.46 | 0 |  | 68 |  |
| DEET | 8.5 | — | — | 81.6 | 8.5 |
| MetOH |  | — | — | 13 | — |

8. Mosquito Repellency Assay of Anatabine Compounds

The compound of the invention is mixed with ethanol to make a composition that can be applied to a surface and allowed to dry. After the surface is treated with the compounds of the invention and dried, it is heated to human body temperature, and the number of landings and the total time spent by the mosquitoes on the warm surface by adult *Aedes aegypti* mosquitoes is recorded automatically by machine vision to measure repellency of each compound.

Repellency (based on the number of individual landings on the warm surface) is expressed as a percentage reduction of the control, where the average number of mosquitoes landing on a warm surface treated only with the vehicle solvent is counted. 100% means no mosquitoes landed on the warm surface.

For mosquitoes that still landed on the warm surface, the time spent on the warm surface is also recorded and expressed as a percentage of the control, corresponding to the average time that mosquitoes spent on the same warm surface when treated only with the vehicle solvent. 100% mean that the mosquitoes spent the same time on the treated warm surface as on a warm surface treated only with the vehicle solvent.

Each compound/dose is tested in triplicate using a surface of 18.9 cm2 and 100 microliters of solution without the compound (the placebo) or with the compound dilution spread on the surface, and allowed to dry before the test. The average and standard error on triplicates is calculated. The control (using only vehicle solvent) is run with ethanol. The same population of mosquitoes is exposed first to the warm surface treated with the vehicle solvent, then to the surface treated with the compound. The concentration of the solution comprising the test compound was adjusted to ensure the treatment dosage of the compound is according to the final concentration per surface units area in the table.

Table 8 and FIGS. 3a and 3b show the results from testing an anatabine as an HCl salt and in its base form. Surprisingly, anatabine in its base form is a significantly better mosquito repellent than the HCl salt form. This is also expressed by a much shorter time spent by mosquitoes on a surface treated with anatabine in its base form compared to anatabine in its HCl salt form.

TABLE 8

| Test Compound Anatabine | Treatment/ Dose [μmol/m²] | Mean landings [%, compared to control] | Standard error | Mean probing time [%, compared to control] | Standard error |
|---|---|---|---|---|---|
| S enantiomer HCl salt | 760 | 28.2 | 9.7 | 62.7 | 13.5 |
| R enantiomer HCl salt | 380 | 25.4 | 33.1 | 71.5 | 16.4 |
| S enantiomer base | 760 | 42.9 | 35.0 | 48.5 | 29.9 |
| R enantiomer base | 380 | 8.1 | 37.4 | 128.9 | 57.8 |
| | 380 | 90.0 | 4.3 | 1.6 | 0.8 |
| | 75 | 86.5 | 12.0 | 20.6 | 10.0 |
| | 380 | 77.9 | 21.16 | 2.7 | 1.4 |
| | 75 | 68.9 | 20.5 | 29.0 | 11.8 |

The invention claimed is:

1. A method for reducing an infestation of ectoparasites, comprising:
applying a compound of Formula I, or a salt or crystal thereof, to a surface of a subject in need thereof:

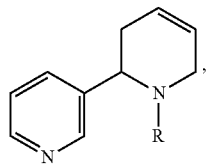

Formula I wherein R represents hydrogen or $C_1$-$C_5$ alkyl, and
wherein the ectoparasite belongs to the phylum arthropoda class wherein the ectoparasite is not a tick.

2. A method for treating an ectoparasite infestation, comprising:
applying a compound of Formula I, or a salt or crystal thereof, to a surface of a subject in need thereof:

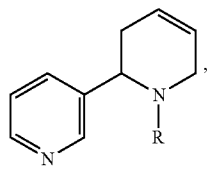

Formula I wherein R represents hydrogen or $C_1$-$C_5$ alkyl, and
wherein the ectoparasite belongs to the phylum arthropoda class wherein the ectoparasite is not a tick.

3. The method of claim 1, wherein R represents hydrogen or $C_1$-$C_3$ alkyl.

4. The method of claim 1, wherein R represents hydrogen.

5. The method of claim 1, wherein the compound is anatabine, S-(−) anatabine, R-(+) anatabine, a mixture of S-(−) anatabine and R-(+) anatabine, or a racemate of S-(−) anatabine and R-(+) anatabine.

6. The method of claim 2, wherein R represents hydrogen or $C_1$-$C_3$ alkyl.

7. The method of claim 2, wherein R represents hydrogen.

8. The method of claim 2, wherein the compound is anatabine, S-(−) anatabine, R-(+) anatabine, a mixture of S-(−) anatabine and R-(+) anatabine, or a racemate of S-(−) anatabine and R-(+) anatabine.

9. A method for reducing and/or treating an infestation of ectoparasites, the method comprising:
applying a tobacco extract enriched for a compound of Formula Ia to a surface of a subject in need thereof:

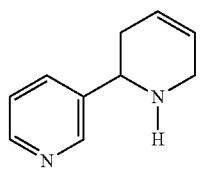 [SMILES: C1=CCC(c2cccnc2)NC1]

wherein the compound of Formula Ia is in a form of a solvate, and the tobacco extract is an extract from a tobacco strain that is enriched in the compound of Formula Ia relative to a wild strain, and
wherein the ectoparasite belongs to the phylum arthropoda class.

10. The method of claim 9, wherein the tobacco extract is obtained from a variety of *Nicotiana tabacum* wherein a major alkaloid is not nicotine.

11. The method of claim 9, wherein the content of the compound of Formula Ia in the tobacco extract is higher than in the unprocessed tobacco plant.

12. The method of claim 9, wherein the relative content of the compound of Formula Ia in the tobacco extract is at least 1% higher than in the unprocessed tobacco plant.

13. The method of claim 9, wherein the relative content of the compound of Formula Ia in the tobacco extract is from 1% to 2% higher than in the unprocessed tobacco plant.

14. The method of claim 9, wherein the relative content of the compound of Formula Ia in the tobacco extract is at least 5% higher than in the unprocessed tobacco plant.

15. The method of claim 9, wherein the relative content of the compound of Formula Ia in the tobacco extract is at least 10% higher than in the unprocessed tobacco plant.

16. The method of claim 9, wherein the relative content of the compound of Formula Ia in the tobacco extract is at least 15% higher than in the unprocessed tobacco plant.

17. The method of claim 1, further comprising:
applying a pharmaceutically acceptable carrier with the compound of Formula I, or the salt or crystal thereof.

18. The method of claim 2, further comprising:
applying a pharmaceutically acceptable carrier with the compound of Formula I, or the salt or crystal thereof.

* * * * *